United States Patent
Yamane et al.

(10) Patent No.: US 11,842,555 B2
(45) Date of Patent: Dec. 12, 2023

(54) SIGNAL ACQUISITION APPARATUS, SIGNAL ACQUISITION SYSTEM, AND SIGNAL ACQUISITION METHOD

(71) Applicant: Sony Group Corporation, Tokyo (JP)

(72) Inventors: Kenji Yamane, Tokyo (JP); Yoichi Mizutani, Tokyo (JP); Nobuhiro Hayashi, Tokyo (JP); Hirokazu Tatsuta, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/642,233

(22) PCT Filed: Mar. 5, 2021

(86) PCT No.: PCT/JP2021/008717
§ 371 (c)(1),
(2) Date: Mar. 11, 2022

(87) PCT Pub. No.: WO2021/177446
PCT Pub. Date: Sep. 10, 2021

(65) Prior Publication Data
US 2022/0319207 A1    Oct. 6, 2022

(30) Foreign Application Priority Data
Mar. 5, 2020 (JP) .................. 2020-037745

(51) Int. Cl.
*G06V 20/69* (2022.01)
*H04N 23/67* (2023.01)
*H04N 23/695* (2023.01)

(52) U.S. Cl.
CPC ........... *G06V 20/695* (2022.01); *H04N 23/67* (2023.01); *H04N 23/695* (2023.01)

(58) Field of Classification Search
CPC .... G06V 20/695; H04N 23/67; H04N 23/695; G01N 2201/1296; G01N 21/6458; G01N 21/31
(Continued)

(56) References Cited

U.S. PATENT DOCUMENTS

| 10,210,376 B2 | 2/2019 | Hedlund et al. |
| 2003/0151735 A1* | 8/2003 | Blumenfeld ....... G01N 21/6428 356/73 |

(Continued)

FOREIGN PATENT DOCUMENTS

| CA | 2430532 A1 | 6/2002 |
| JP | 2014-149381 A1 | 8/2014 |

OTHER PUBLICATIONS

International Search Report and Written Opinion dated May 27, 2021, received for PCT Application PCT/JP2021/008717, Filed on Mar. 5, 2021, 11 pages.

(Continued)

*Primary Examiner* — Stephen P Coleman
(74) *Attorney, Agent, or Firm* — XSENSUS LLP

(57) ABSTRACT

A signal acquisition apparatus includes a light source that irradiates a living tissue with light and a detector that acquires signals from light returned from the living tissue to generate output data on the basis of the signals. The detector includes circuitry that acquires the signals and characteristic data regarding the signals and generates the output data on the basis of the characteristic data. The circuitry is implemented in a single semiconductor chip. Further, the present technology also provides a signal acquisition system including the signal acquisition apparatus and an analysis unit configured to analyze output data output from the image acquisition apparatus.

31 Claims, 14 Drawing Sheets

(58) Field of Classification Search
USPC .......................................................... 382/133
See application file for complete search history.

(56) References Cited

U.S. PATENT DOCUMENTS

2003/0162301 A1* 8/2003 Noergaard ........... A61B 5/7267
422/52
2019/0277870 A1 9/2019 Kluckner et al.

OTHER PUBLICATIONS

Wei et al., "Neural Network Control of Focal Position During Time-lapse Microscopy of Cells", Department of Biophysics, Dec. 13, 2017, pp. 1-22.

* cited by examiner

[Fig. 1]
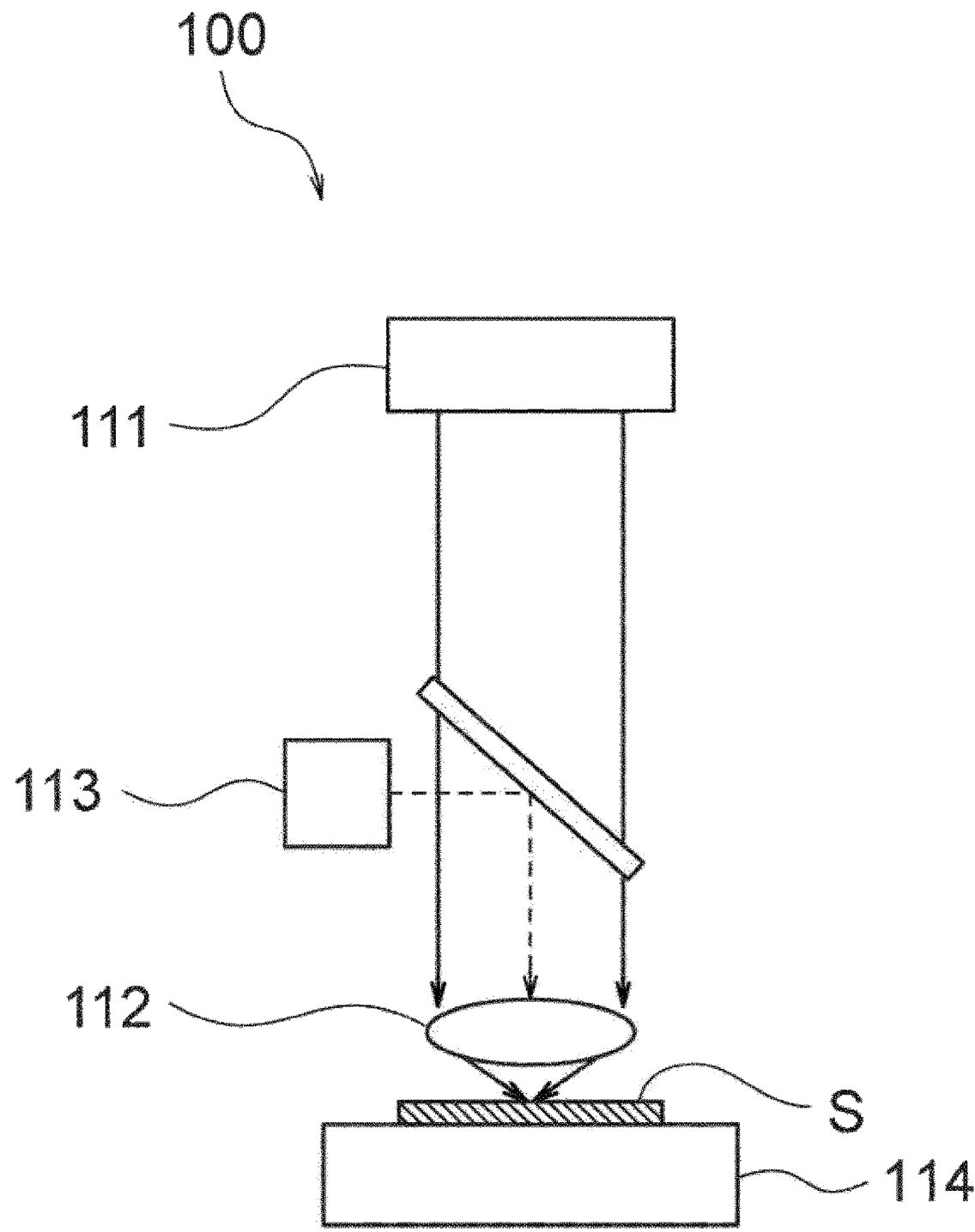

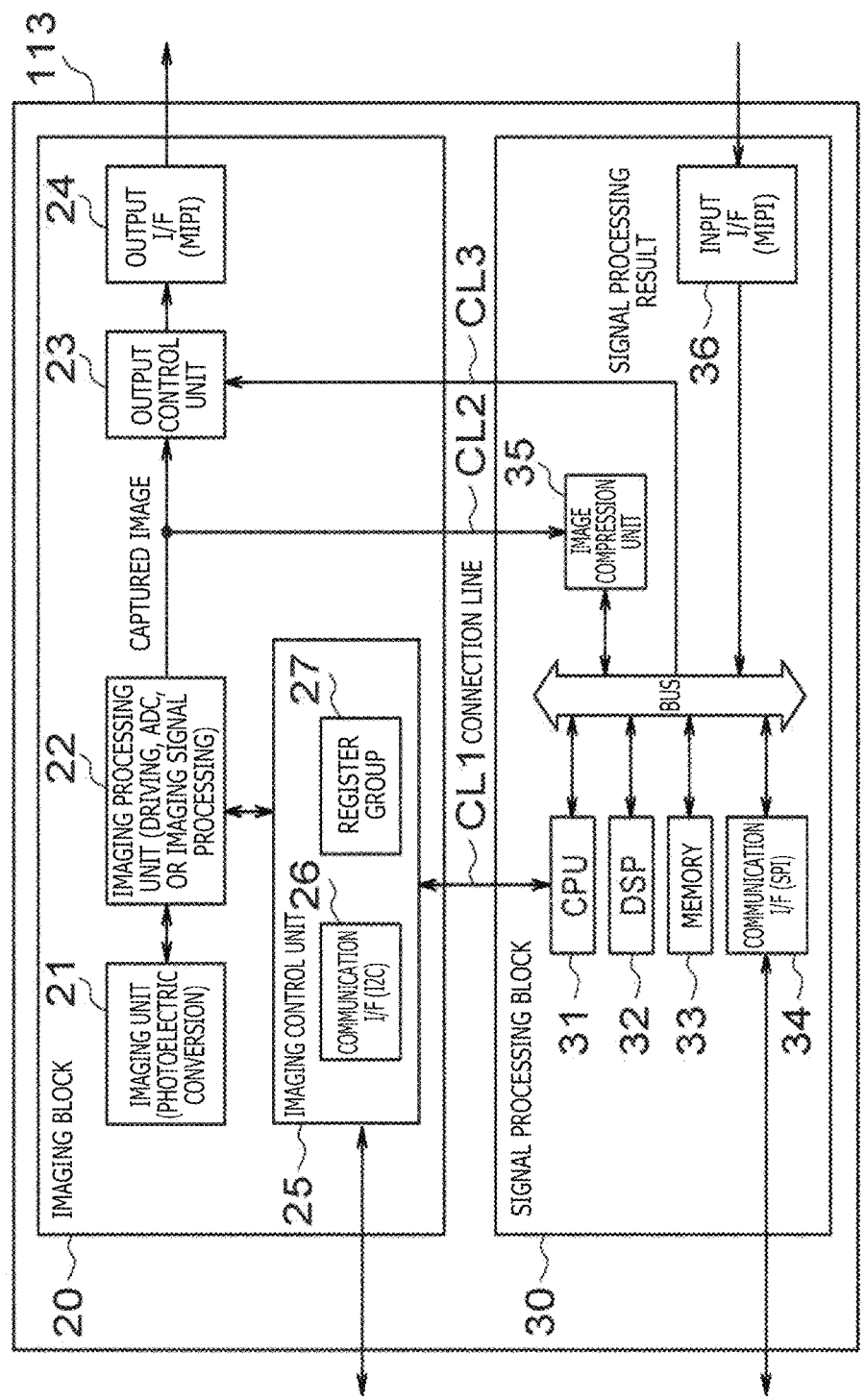
[Fig. 2]

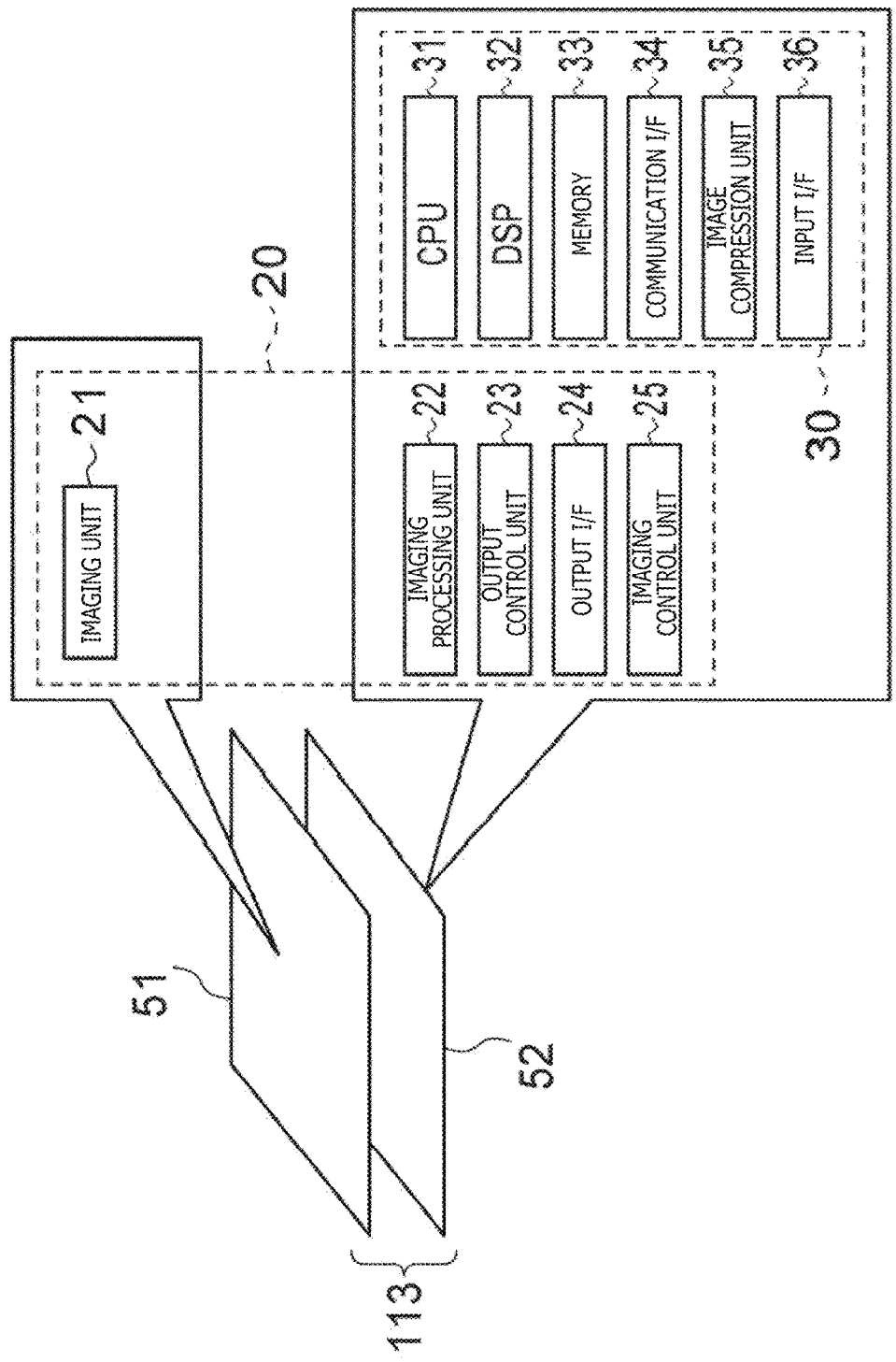

[Fig. 4]
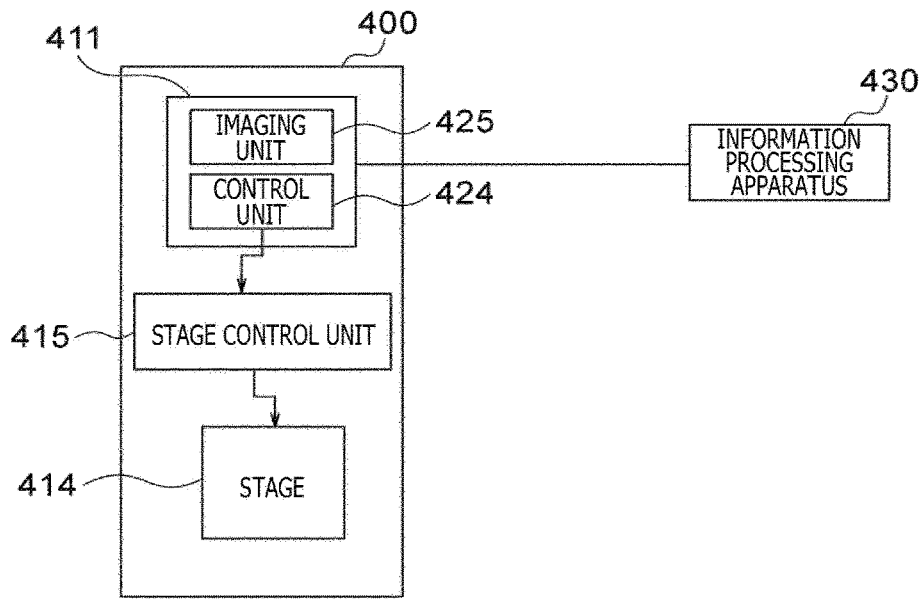
[Fig. 5]
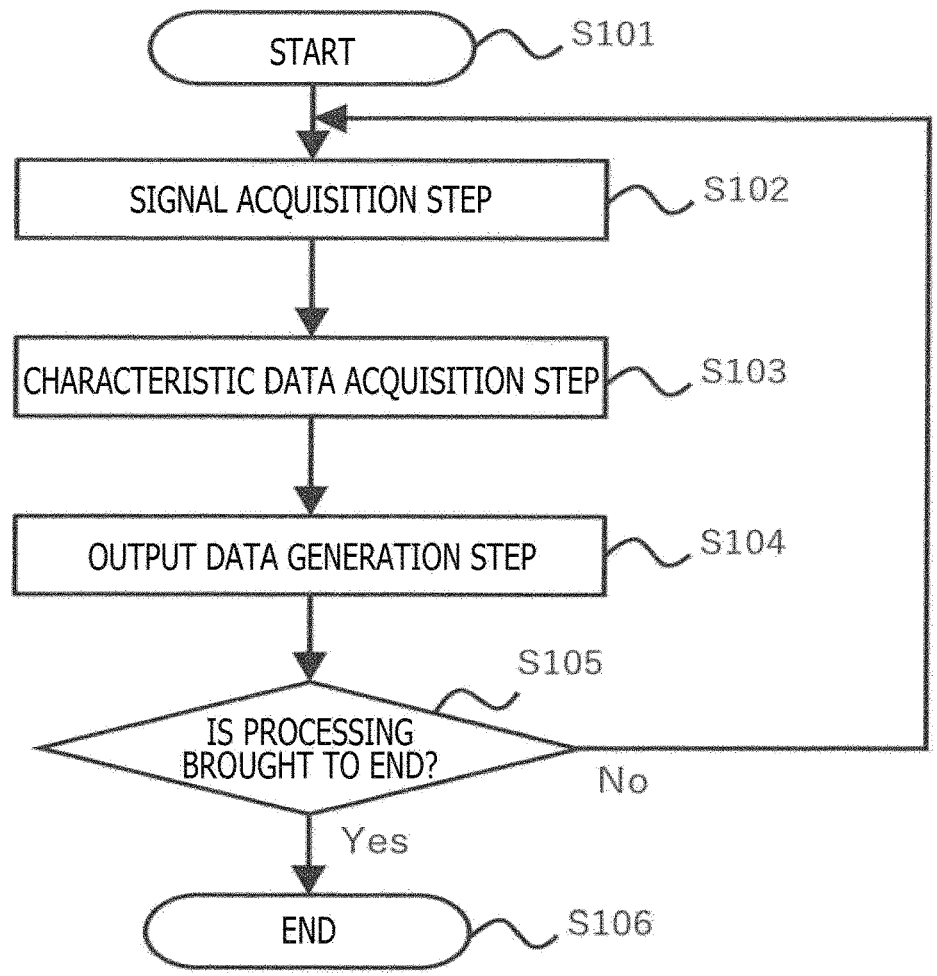

[Fig. 6]
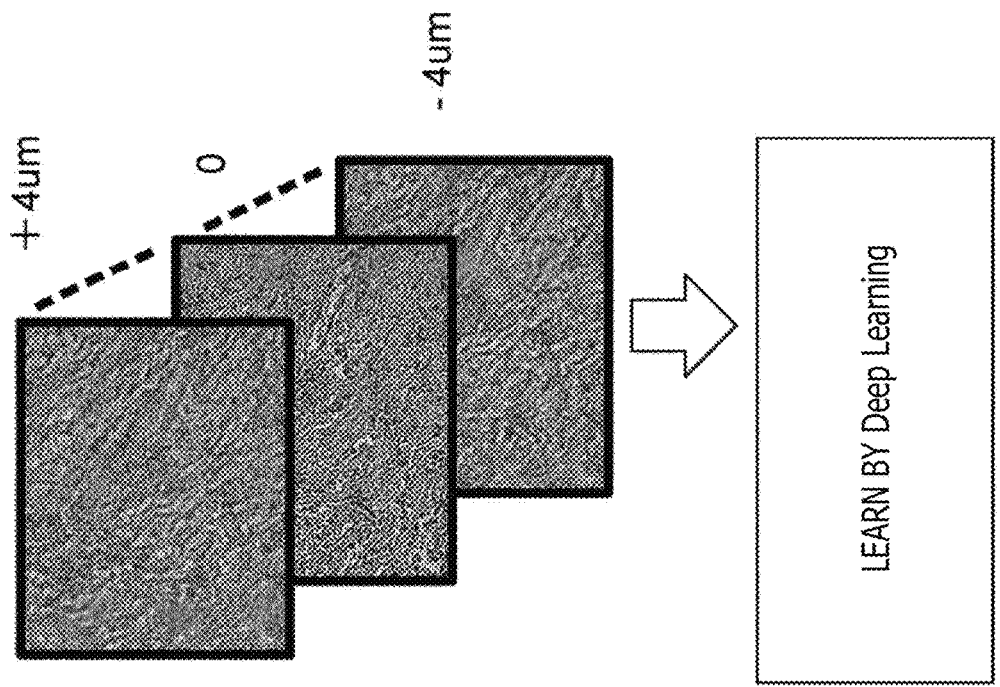
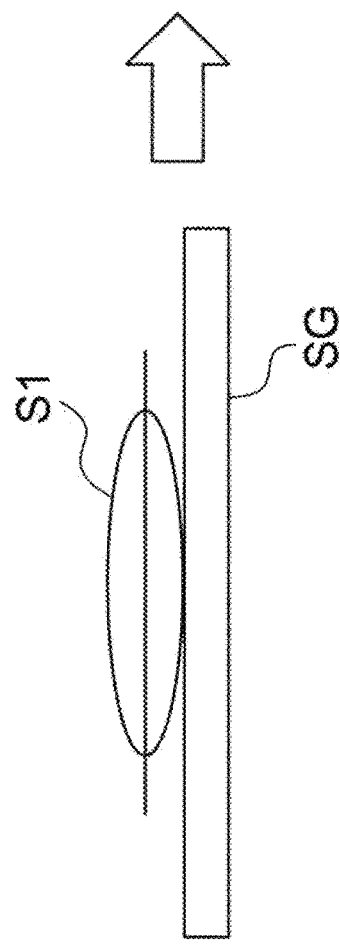

[Fig. 7]
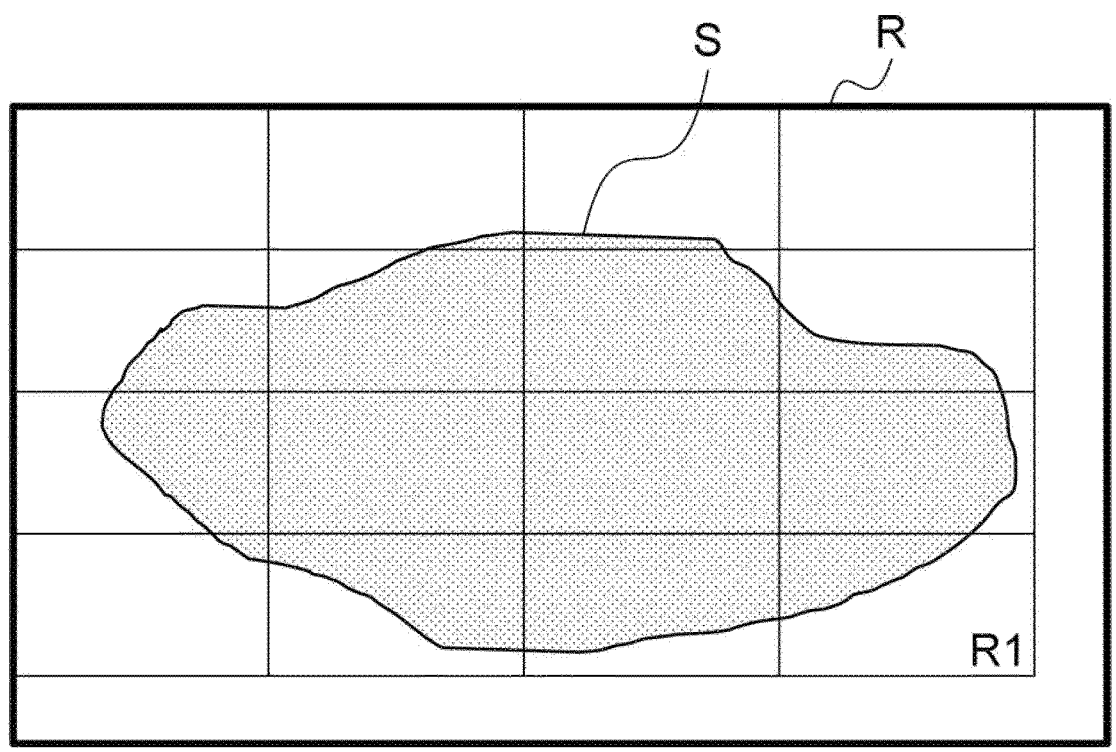

[Fig. 8]
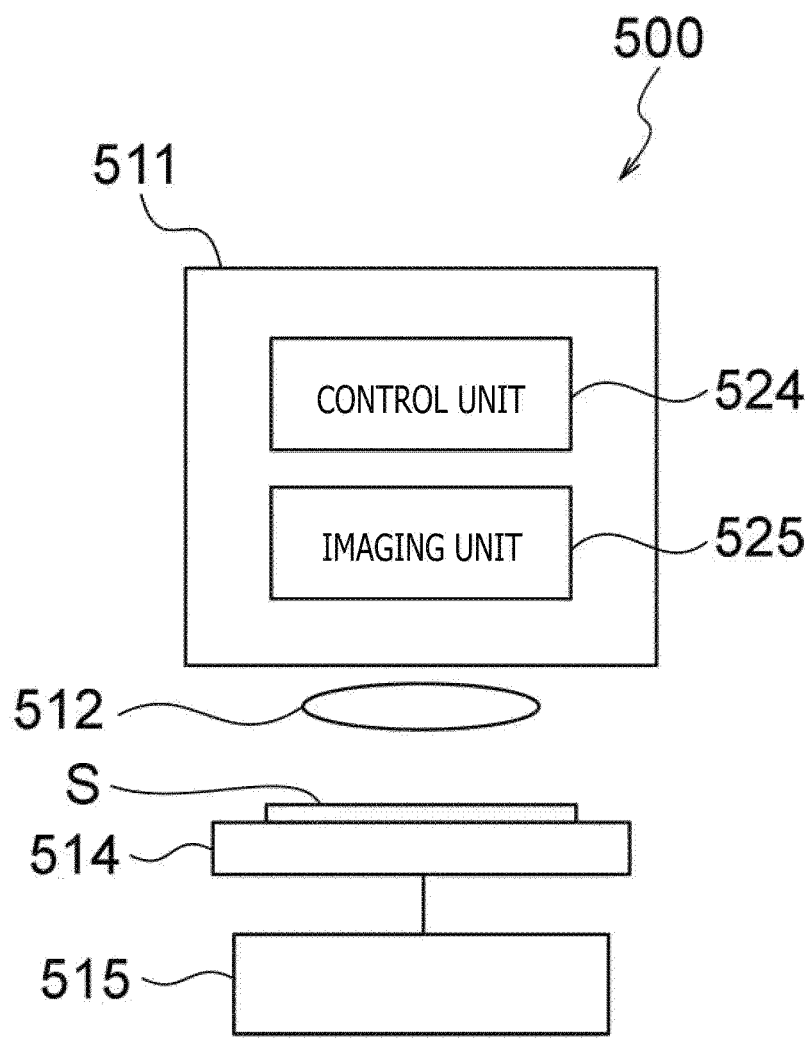

[Fig. 9]
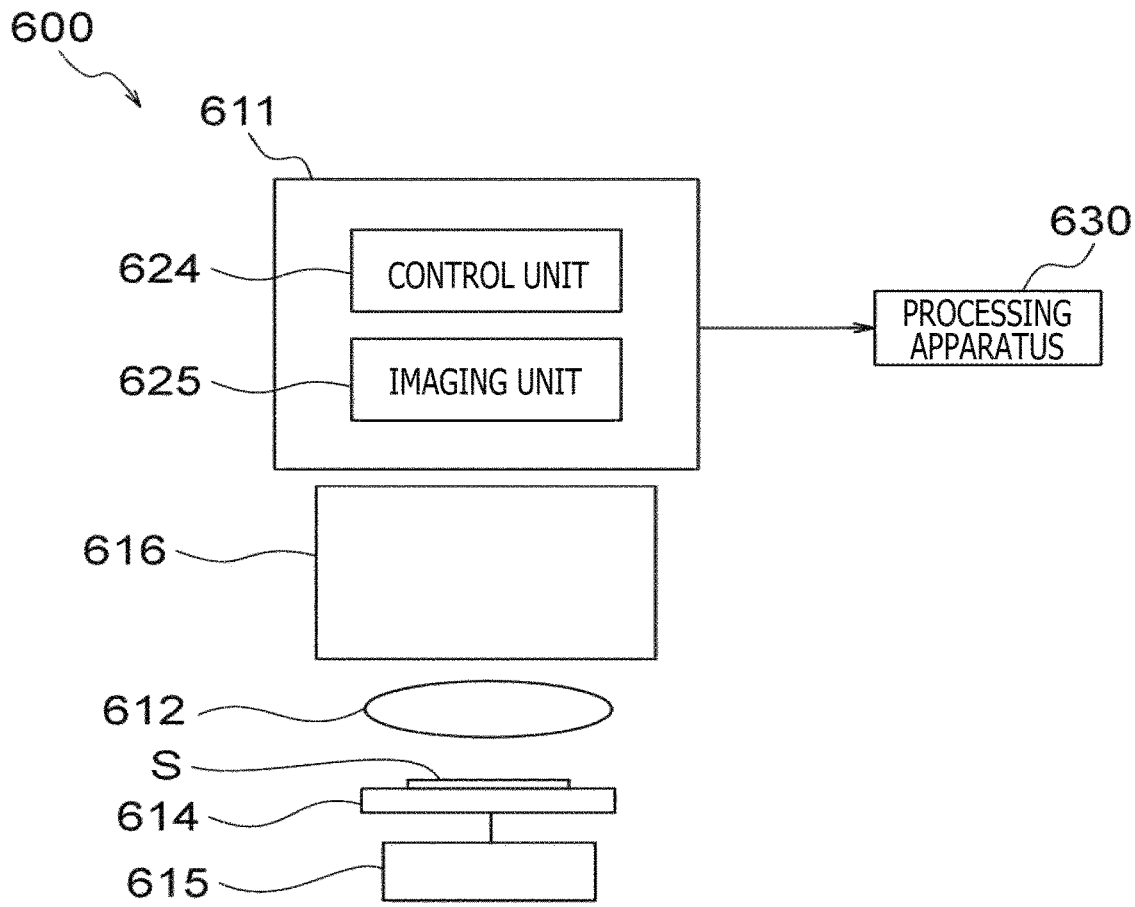
[Fig. 10]
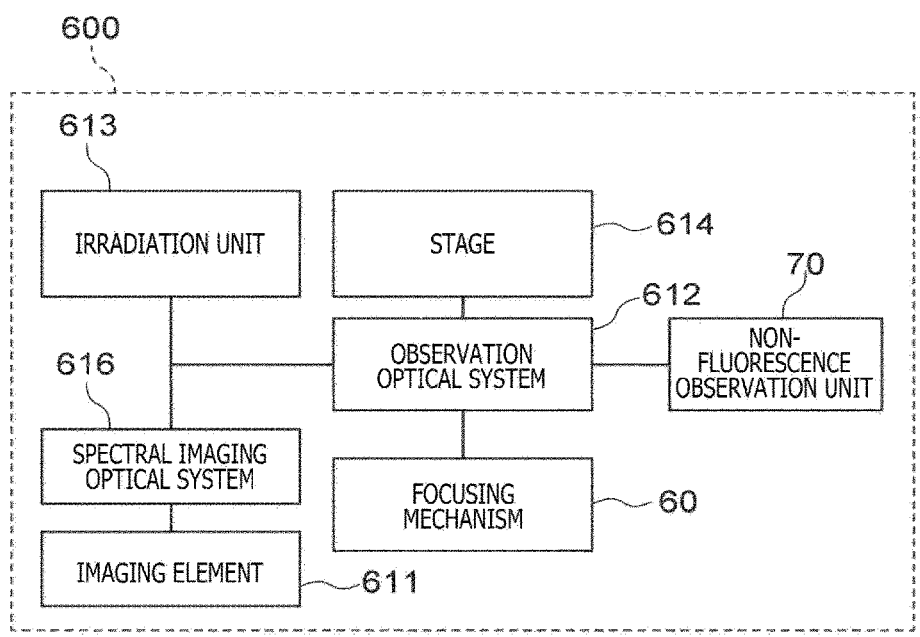

[Fig. 11]
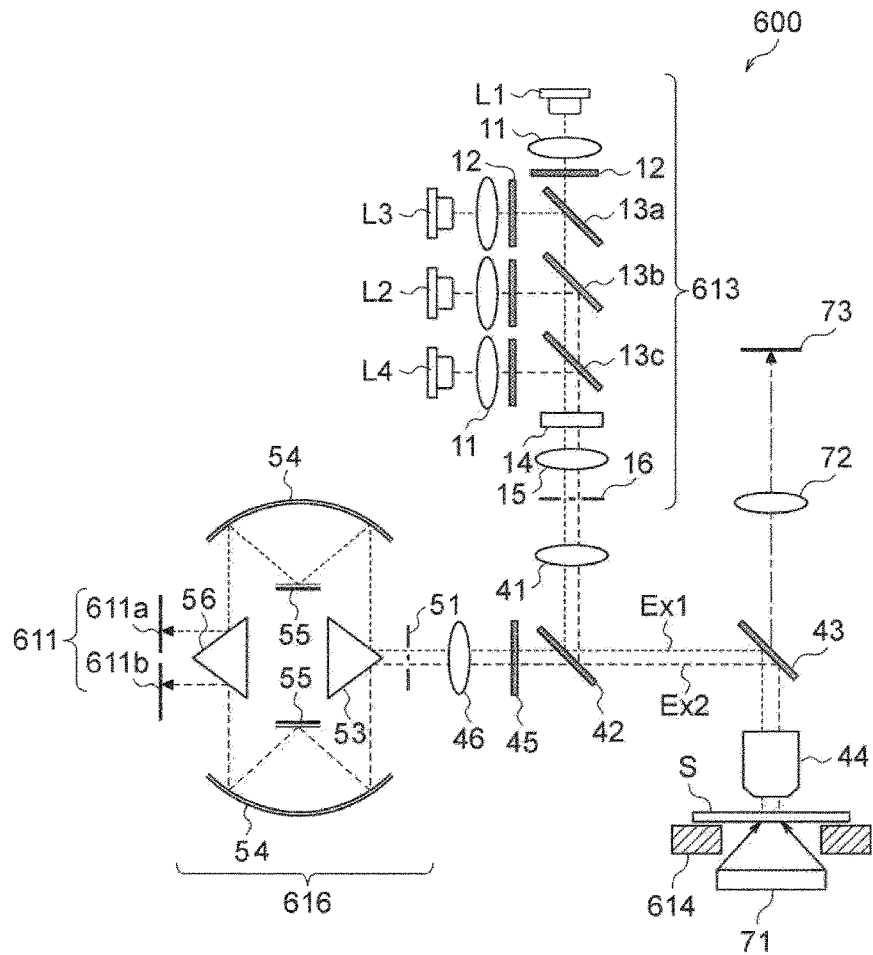
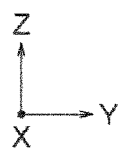
[Fig. 12]
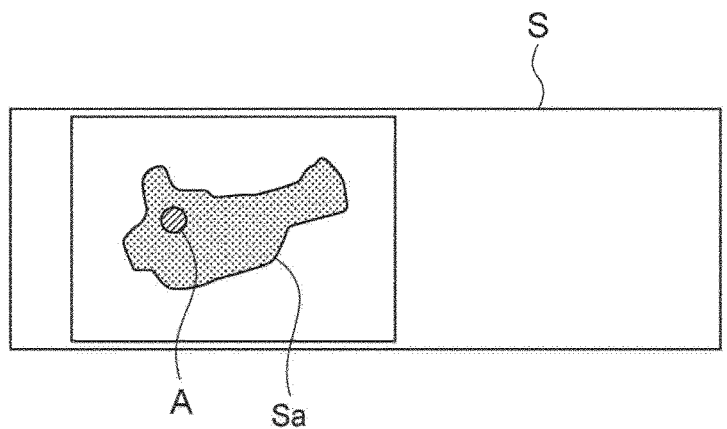

[Fig. 13]
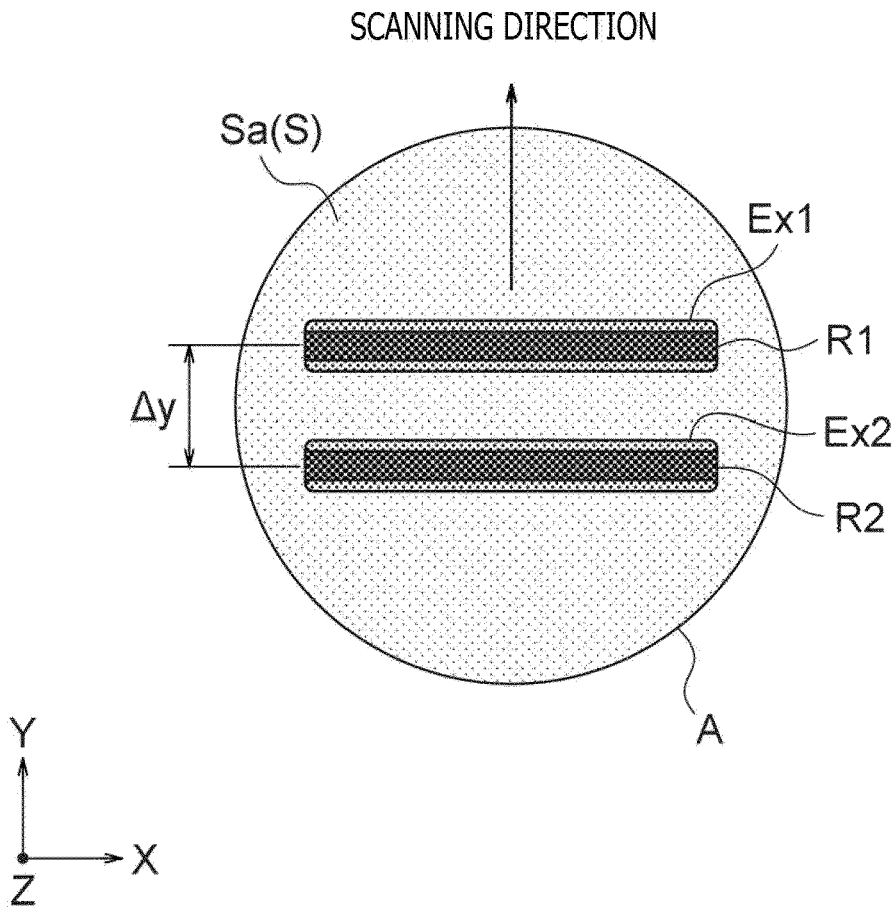
[Fig. 14]
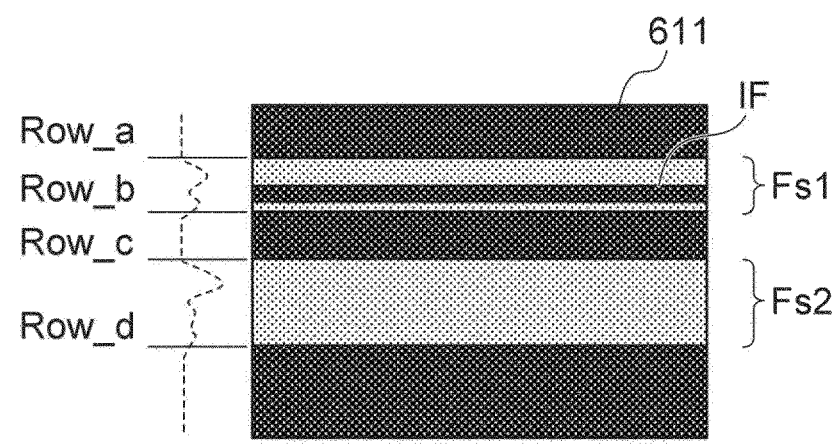

[Fig. 15]
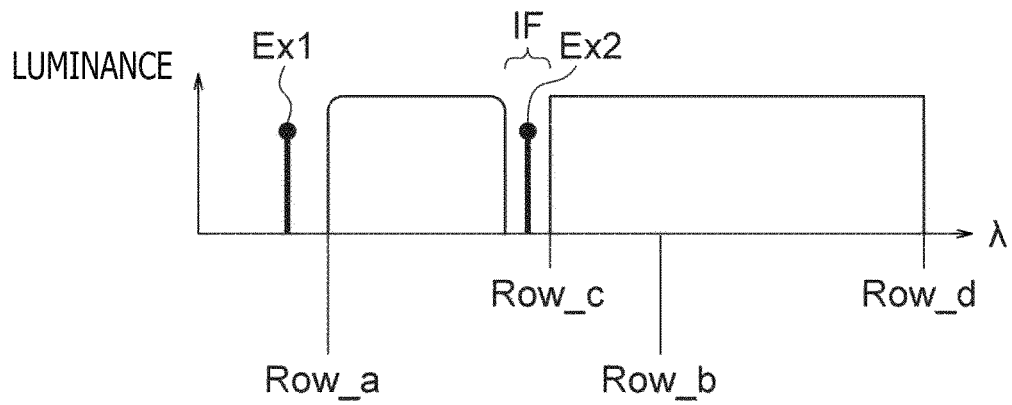
[Fig. 16]
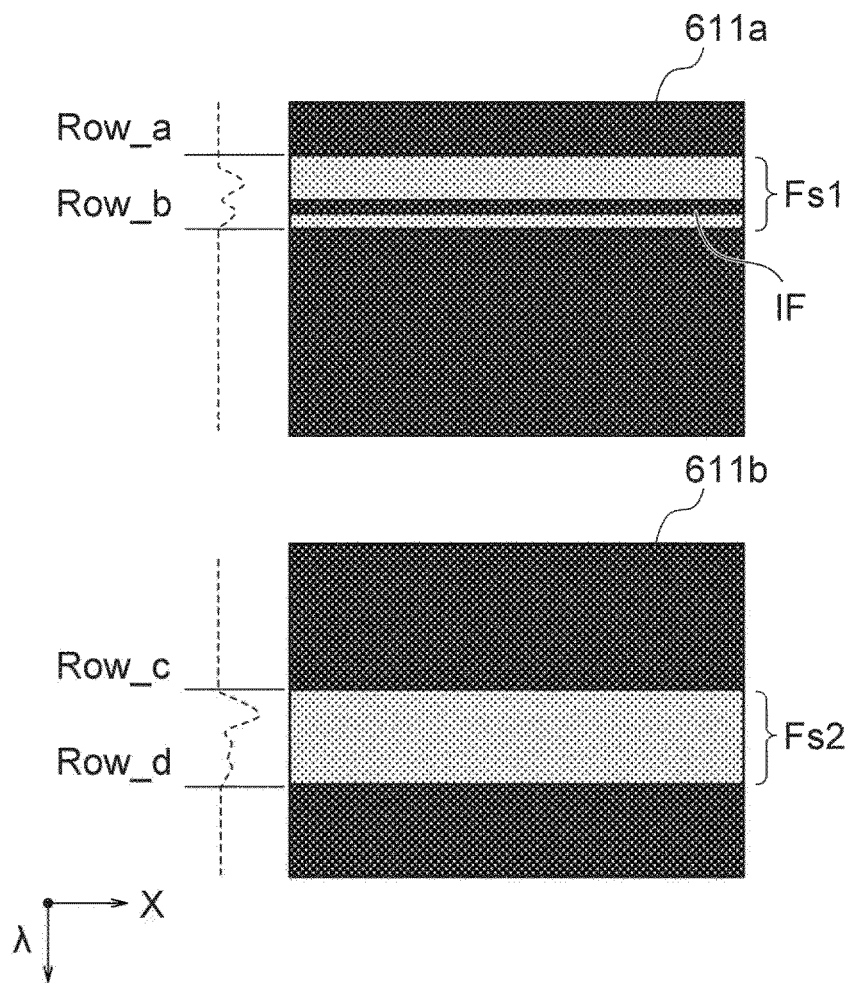

[Fig. 17]
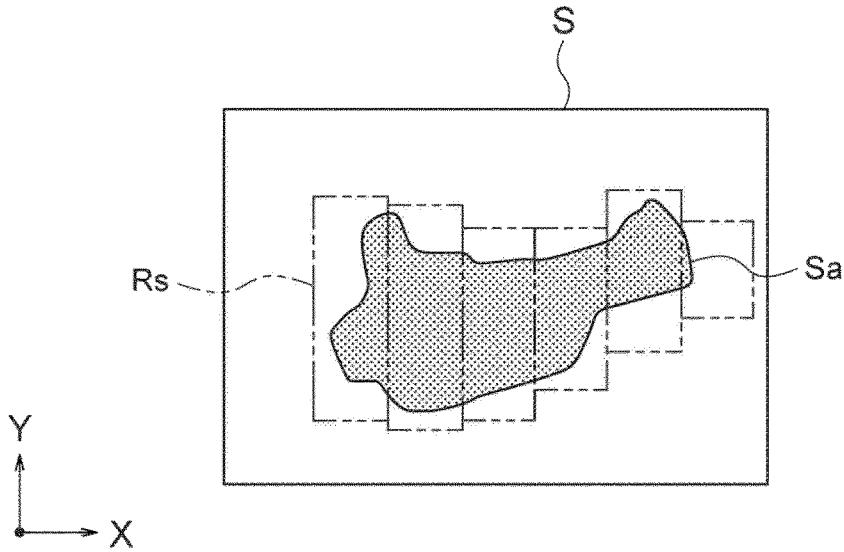
[Fig. 18]
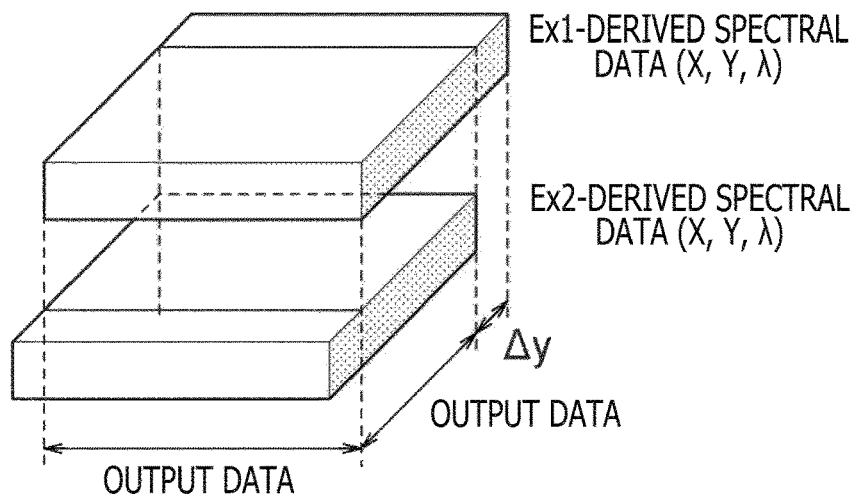
[Fig. 19]
| ILLUMINATION LINE | CONFIGURATION EXAMPLE 1 | CONFIGURATION EXAMPLE 2 | CONFIGURATION EXAMPLE 3 |
|---|---|---|---|
| Ex1 | 405nm | 405nm, 561nm | 405nm, 561nm, 488nm, 645nm |
| Ex2 | 488nm | 488nm, 645nm | — |
| Ex3 | 561nm | — | — |
| Ex4 | 645nm | — | — |

[Fig. 20]
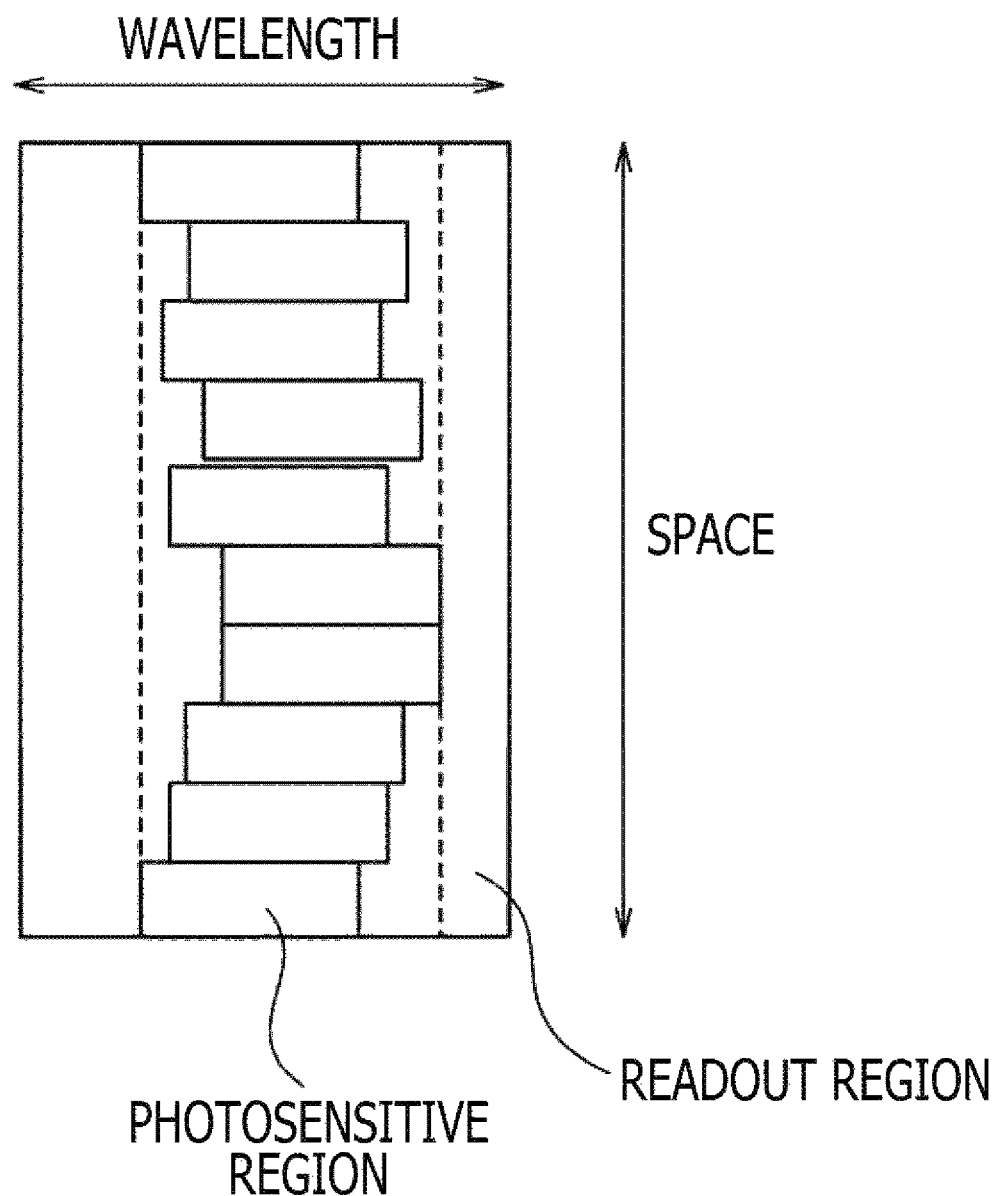

[Fig. 21]
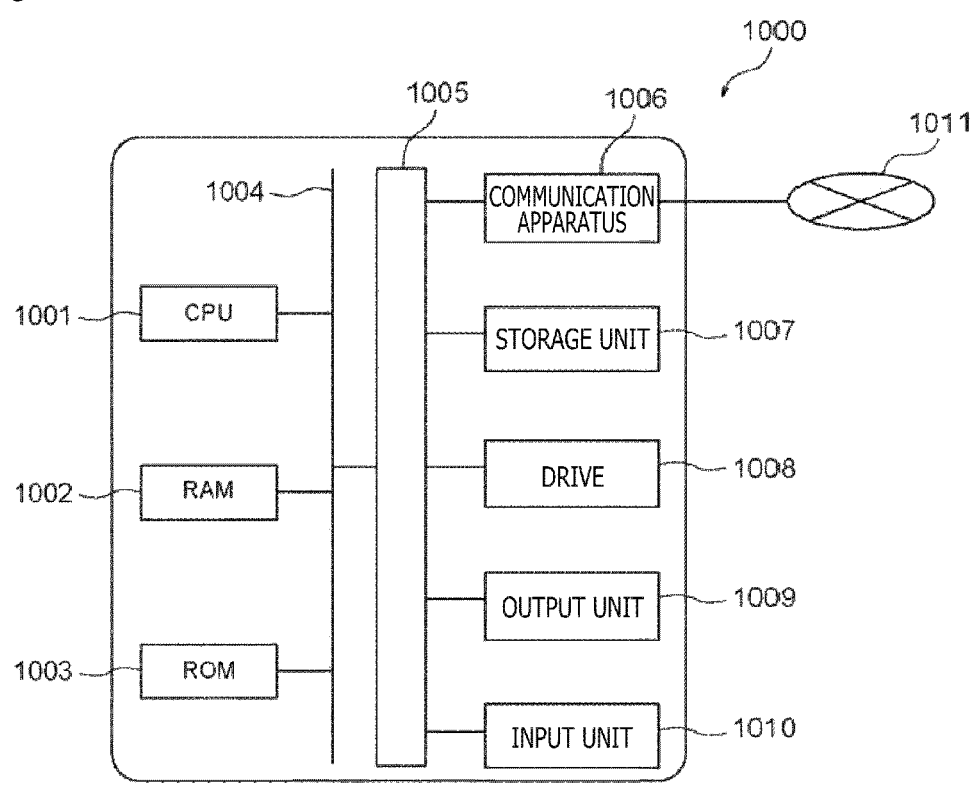

SIGNAL ACQUISITION APPARATUS, SIGNAL ACQUISITION SYSTEM, AND SIGNAL ACQUISITION METHOD

CROSS-REFERENCE TO RELATED APPLICATIONS

The present application is based on PCT/JP2021/008717 filed on Mar. 5, 2021, and claims priority to JP 2020-037745 filed on Mar. 5, 2020, the entire contents of each are incorporated herein by reference.

TECHNICAL FIELD

The present technology relates to a signal acquisition apparatus, a signal acquisition system, and a signal acquisition method. More specifically, the present technology relates to a signal acquisition apparatus configured to acquire signals from light from living tissues, a signal acquisition system including the signal acquisition apparatus, and a signal acquisition method for acquiring signals from light from living tissues.

BACKGROUND ART

The images of living tissues obtained by a microscope apparatus are used for a pathological diagnosis in some cases. In recent years, a digital image of a living tissue is acquired, and a pathological diagnosis is made on the basis of the digital image, in some cases. As a technology for acquiring the digital image, some technologies have hitherto been proposed.

For example, Patent Document 1 below discloses an image acquisition apparatus including a photographing unit configured to photograph a pathological sample mounted on a microscope slide by using an objective lens, an AF (Auto Focus) processing unit capable of selectively switching and executing a contrast AF method and a phase difference AF method to make the objective lens focus on the pathological sample, and a calculation unit configured to determine a staining method for the pathological sample and select the AF method to be executed by the AF processing unit on the basis of a result of the determination.

CITATION LIST

Patent Literature

PTL 1: Japanese Patent Laid-open No. 2014-149381

SUMMARY

Problems to be Solved by the Invention

To make a pathological diagnosis by use of digital images, living tissue images obtained with appropriate focus adjustment are needed. To achieve such focus adjustment, it is conceivable to use a plurality of images captured at a plurality of different positions in the optical axis direction of an objective lens. For example, the plurality of images is transmitted from an imaging element to an information processing apparatus, and then, a focal position can be identified by the information processing apparatus by using the plurality of images. However, it often takes a long time to transmit the data regarding the plurality of images. Further, the transmission speed may depend on the output interface of the imaging element.

Further, to make the pathological diagnosis by use of digital images, it is also conceivable to use images obtained by imaging living tissues from various perspectives. For example, it is conceivable to image a living tissue by using light having various wavelengths, thereby acquiring more detailed characteristics of the living tissue. Such imaging often produces a massive amount of image data. As the amount of image data increases, the problem of time required for data transmission and the problem of the speed-limiting effect of the output interfaces of imaging elements on data transmission become more conspicuous.

In view of this, the present technology has an object to provide a novel technique for achieving high-speed image data processing.

Means for Solving the Problems

According to the present technology, there is provided a signal acquisition apparatus including:

an irradiation unit configured to irradiate a living tissue with light; and a detector configured to acquire, after light irradiation by the irradiation unit, signals from light from the living tissue and generate output data based on the signals, in which the detector includes an acquisition unit configured to acquire the signals, and a control unit configured to acquire characteristic data regarding the signals and generate the output data based on the characteristic data, and the acquisition unit and the control unit of the detector are disposed in a single semiconductor chip.

The detector may include an imaging element.

The signals may each include a pixel signal.

The control unit may acquire the characteristic data regarding the signals by using a learned model.

The control unit may control the output data by using a learned model.

According to one embodiment of the present technology, the detector may include an imaging element, and the control unit may control the output data, based on focus state information upon imaging performed by the imaging element.

In the embodiment, the focus state information may include focus state information regarding at least some of the signals.

In the embodiment, the focus state information may include a Z position upon the imaging, an amount of blur of the signals, or an amount of deviation of the Z position from an in-focus position.

In the embodiment, the control unit may acquire the focus state information by using a learned model.

In the embodiment, the control unit may determine whether to execute focus adjustment, based on the focus state information.

In the embodiment, the control unit may execute the focus adjustment based on the focus state information, and then, the imaging element may image the living tissue at a position where the focus adjustment is executed.

In the embodiment, the control unit may generate the output data based on a signal obtained upon imaging at the position where the focus adjustment is executed.

According to another embodiment of the present technology, the detector may include an imaging element, and
the control unit may determine, based on the characteristic data regarding the signals, whether to execute focus adjustment for imaging performed by the imaging element.

In the embodiment, the control unit may drive, based on the characteristic data, the acquisition unit to image the living tissue at a position where the focus adjustment is executed.

In the embodiment, the control unit may generate the output data based on the signals and a signal obtained upon imaging at the position where the focus adjustment is executed.

According to still another embodiment of the present technology, the detector may include an imaging element,
the acquisition unit may acquire signals from the light from the living tissue at a plurality of positions in an optical axis direction upon imaging performed by the imaging element, and
the control unit may acquire, from a set of the signals acquired at the plurality of positions, signal correlation information or focus state information.

In the embodiment, the focus state information may include a focus detection value.

In the embodiment, the control unit may generate an output image based on a plurality of pieces of the focus state information and control the imaging element to output the output image.

In the embodiment, the output image may include an image generated from a signal acquired at a certain Z position in the signal set.

In the embodiment, the output image may include an image generated from a most focused signal in the signal set.

In the embodiment, the output image may include an image generated from signals acquired at a plurality of Z positions in the signal set.

In the embodiment, the control unit may generate the output image by using a learned model.

In the embodiment, the control unit may divide each of images based on the signals acquired at the plurality of positions into a plurality of regions, acquire focus state information regarding each of the plurality of regions, and connect images of regions in focus to generate the output image.

According to yet another embodiment of the present technology, the control unit may acquire spectrum effective region information based on the signals obtained by the acquisition unit.

In the embodiment, the control unit may acquire the spectrum effective region information by using a learned model.

In the embodiment, the control unit may control a readout region of the detector based on the spectrum effective region information.

In the present technology, the acquisition unit may acquire the signals from the light from the living tissue through an objective lens.

In the present technology, the living tissue may include a bio-derived tissue sample.

In the present technology, the signal acquisition apparatus may further include an output unit configured to output the output data.

In the present technology, the signal acquisition apparatus may further include an analysis unit configured to analyze the output data.

According to the present technology, there is also provided a signal acquisition system including:

a signal acquisition apparatus including
an irradiation unit configured to irradiate a living tissue with light, and
a detector configured to acquire a signal from light from the living tissue irradiated with the light by the irradiation unit and generate output data based on the signal,
the detector including
an acquisition unit configured to acquire the signal, and
a control unit configured to acquire characteristic data regarding the signal and generate the output data based on the characteristic data,
the acquisition unit and the control unit of the detector being disposed in a single semiconductor chip; and
an analysis unit configured to analyze the output data output from the signal acquisition apparatus.

The image acquisition system may include a medical image acquisition system.

The image acquisition system may include an endoscope system or a microscope system.

Further, according to the present technology, there is provided a signal acquisition method including:

a signal acquisition step of acquiring a signal from light from a living tissue irradiated with light;
a characteristic data acquisition step of acquiring characteristic data regarding the signal obtained in the signal acquisition step; and
an output data generation step of generating output data based on the characteristic data.

BRIEF DESCRIPTION OF DRAWINGS

FIG. 1 is a schematic view illustrating a configuration example of a signal acquisition apparatus according to the present technology.

FIG. 2 is a diagram illustrating a configuration example of a detector.

FIG. 3 is a perspective view illustrating an overview of an appearance configuration example of the detector.

FIG. 4 is a block diagram of an example of the signal acquisition apparatus according to the present technology.

FIG. 5 is a flow chart illustrating an example of processing that is performed by the signal acquisition apparatus according to the present technology.

FIG. 6 is a diagram illustrating an example of how to generate a learned model.

FIG. 7 is a diagram illustrating how to divide an imaging target.

FIG. 8 is a block diagram of an example of the signal acquisition apparatus according to the present technology.

FIG. 9 is a block diagram of an example of the signal acquisition apparatus according to the present technology.

FIG. 10 is a diagram illustrating a configuration example of the signal acquisition apparatus configured to perform imaging by a line scanning method.

FIG. 11 is a diagram illustrating a configuration example of an optical system of the signal acquisition apparatus configured to perform imaging by the line scanning method.

FIG. 12 is a diagram illustrating an example of the imaging target.

FIG. 13 is an enlarged view of a part of the imaging target, illustrating illuminating areas and photographing areas.

FIG. 14 is a diagram illustrating a spectral data acquisition method in a case where an imaging element includes a single image sensor.

FIG. 15 is a diagram illustrating the wavelength characteristics of the spectral data acquired in FIG. 14.

FIG. 16 is a diagram illustrating a spectral data acquisition method in a case where the imaging element includes a plurality of image sensors.

FIG. 17 is a conceptual diagram illustrating a scanning method with line illumination with which subjects are irradiated.

FIG. 18 is a conceptual diagram illustrating three-dimensional data (X, Y, λ) acquired with a plurality of line illumination beams.

FIG. 19 is a diagram illustrating a configuration example of the wavelength of an irradiation unit.

FIG. 20 is a diagram illustrating a photosensitive region and a readout region of the imaging element.

FIG. 21 is a diagram illustrating a configuration example of an information processing apparatus.

MODES FOR CARRYING OUT THE INVENTION

Hereinafter, preferred modes for carrying out the present technology are described. Note that embodiments described below are representative embodiments of the present technology, and the scope of the present technology is not limited to the embodiments. Note that explanations of the present technology are given in the following order.

1. First embodiment (signal acquisition apparatus)
(1) Description of first embodiment
(2) Example of first embodiment
(2-1) Irradiation unit
(2-2) Observation optical system
(2-3) Detector
(2-3-1) Control unit
(2-3-2) Configuration example of detector
(2-4) Other components
(2-5) First example of signal acquisition processing (image acquisition using focus
state information)
(2-5-1) Configuration example of signal acquisition apparatus
(2-5-2) Example of signal acquisition processing flow
(2-5-3) Another example of output data control
(2-6) Second example of signal acquisition processing (image acquisition processing
in which imaging is performed a plurality of times)
(2-6-1) Configuration example of signal acquisition apparatus
(2-6-2) Example of signal acquisition processing flow (compressed image acquisition)
(2-6-3) Example of signal acquisition processing flow (focus adjustment)
(2-6-4) Example of signal acquisition processing flow (analysis)
(2-7) Third example of signal acquisition processing (image acquisition processing
using spectrum effective region information)
(2-7-1) Configuration example of signal acquisition apparatus
(2-7-2) Configuration example of optical system of signal acquisition apparatus
(2-7-3) Example of signal acquisition processing flow
2. Second embodiment (signal acquisition system)
3. Third embodiment (signal acquisition method)

1. First Embodiment (Signal Acquisition Apparatus)

(1) Description of First Embodiment

As described above, as the amount of image data that is used for, for example, a pathological diagnosis or the like increases, it takes a longer time to transmit the data, and the speed-limiting effect of data transmission interfaces becomes more conspicuous.

In particular, in recent years, the number of pixels of imaging elements has been increasing, and the number of pixels per frame has been increasing. Along with this, the amount of data that is output from the imaging elements has also been increasing. For example, in a case where an imaging element having 100 M pixels and 12 bit/pixel performs imaging at 20 frame/s, a high-speed data transmission of 100 M×12×20=24 M bit/s is needed, and the transmission time period per frame is 50 ms.

Meanwhile, light receiving elements can operate in a sufficiently short exposure time period of, for example, 1 ms. That is, the light receiving elements can generally receive light in a short period of time. Thus, the processing speed of data obtained by capturing an image may depend on the speed of data transmission.

A signal acquisition apparatus according to the present technology includes an irradiation unit configured to irradiate a living tissue with light and a detector configured to acquire, after light irradiation by the irradiation unit, signals from light from the living tissue and generate output data on the basis of the signals.

The detector may be configured to receive the light from the living tissue irradiated with the light by the irradiation unit and convert the light into signals, specifically, electrical signals, more specifically, digital electrical signals. The detector may acquire the signals from the light from the living tissue, by the conversion. The detector generates the output data on the basis of the acquired signals.

The detector may include, for example, an acquisition unit configured to acquire the signals and a control unit configured to acquire characteristic data regarding the signals and generate the output data on the basis of the characteristic data. In the preferred embodiment of the present technology, the acquisition unit and the control unit of the detector may be disposed in a single semiconductor chip. The detector may be, for example, an imaging element or a photodetector. In a case where the detector is an imaging element, the signals may be pixel signals. In a case where the detector is a photodetector, the signals may be optical signals.

Since the detector included in the signal acquisition apparatus according to the present technology includes the control unit (in particular, the control unit is disposed in the chip), for example, the output data is controlled in the detector (for example, the generation of output data is controlled). With this, for example, the amount of output data can be reduced. For example, in the case where the detector is an imaging element, by the control unit, not image data itself obtained by capturing an image but data obtained by converting the image data so as to have a smaller data amount can be output to outside the imaging element. Consequently, time required for data transmission can be shortened, and the speed-limiting effect of the transmission interface can also be reduced. In this way, according to the present technology, a massive amount of image data can be processed at high speed.

(2) Example of First Embodiment

An example of the signal acquisition apparatus according to the present technology and an example of signal acquisition processing by the signal acquisition apparatus are described below with reference to FIG. 1.

FIG. 1 is a schematic view illustrating a configuration example of the signal acquisition apparatus according to the present technology. A signal acquisition apparatus 100 illustrated in FIG. 1 includes a detector 111, an observation optical system 112, and an irradiation unit 113. The signal acquisition apparatus 100 may further include a stage 114 on which a living tissue S (hereinafter also referred to as a "subject S") is placed. The signal acquisition apparatus 100 is configured to image the subject S placed on the stage 114.

Note that the signal acquisition apparatus illustrated in FIG. 1 represents a schematic configuration example of an image acquisition apparatus, but the signal acquisition apparatus according to the present technology may be a signal acquisition apparatus other than an image acquisition apparatus. The signal acquisition apparatus according to the present technology may be an optical signal acquisition apparatus, for example. Examples of the optical signal acquisition apparatus can include a particle analysis apparatus such as a flow cytometer. The signal acquisition apparatus according to the present technology may be configured as a medical observation apparatus or medical observation system configured to acquire signals from light from living tissues. Examples of the apparatus or the system include a microscope apparatus and an endoscope apparatus, but the signal acquisition apparatus is not limited thereto.

Further, the signal acquisition apparatus illustrated in FIG. 1 represents a schematic configuration example of the image acquisition apparatus employing the coaxial epi-illumination method, which is often used for fluorescence observation, but the illumination method in the present technology is not limited thereto. For example, the signal acquisition apparatus according to the present technology may be a transillumination signal acquisition apparatus. The transillumination method may be employed in bright field observation, for example.

The signal acquisition apparatus according to the present technology may be configured as a microscope apparatus, for example, and may be configured as a bright field microscope apparatus, a dark field microscope apparatus, or a fluorescence microscope apparatus. For example, the signal acquisition apparatus according to the present technology may be configured as what is called a WSI (Whole Slid Imaging) scanner.

The living tissue (tissue) may be selected depending on the configuration of the signal acquisition apparatus.

In a case where the signal acquisition apparatus according to the present technology is a microscope apparatus, the living tissue is, for example, a bio-derived sample and may be a bio-derived tissue sample, for example. The sample may be a frozen section or a paraffin section. The sample may be a tissue sample, a cell sample, or a living cell (for example, a living cell in cultivation).

In a case where the signal acquisition apparatus according to the present technology is an endoscope apparatus or a microscope apparatus, the living tissue may be a body tissue or an organ.

In a case where the signal acquisition apparatus according to the present technology is a particle analysis apparatus, the living tissue may be a biological microparticle such as a cell, a cell clump, a microbe, or a liposome. Further, the particle analysis apparatus may be configured to analyze synthetic microparticles such as gel particles, beads, latex particles, polymer particles, and industrial particles.

(2-1) Irradiation Unit

The irradiation unit 113 is an optical system (or light source) for illuminating the subject S upon signal acquisition by the detector 111 and irradiates the subject S with light. In a case where the detector 111 is an imaging element, the irradiation unit 113 may be an optical system for illuminating the subject S upon imaging performed by the imaging element 111.

The irradiation unit 113 includes a light source for the illumination and may irradiate the subject S with visible light or ultraviolet radiation, for example. The light source included in the irradiation unit 113 may appropriately be selected by persons skilled in the art depending on the types of signals or output data to be acquired by the detector 111. In the case where the detector 111 is an imaging element, the light source may appropriately be selected by persons skilled in the art depending on the types of pixel signals or image data to be acquired by the imaging element 111 and may include, for example, at least one of a halogen lamp, an LED lamp, a mercury lamp, or a xenon lamp. For example, in a case where the image data is bright field image data, the irradiation unit 113 may include an LED lamp or a halogen lamp, for example. In a case where the image data is fluorescent image data, the irradiation unit 113 may include a laser light source, an LED lamp, a mercury lamp, or a xenon lamp, for example. Depending on the types of fluorescent substances that emit fluorescence, the wavelength of light to be emitted or the types of lamps may be selected.

(2-2) Observation Optical System

The observation optical system 112 may appropriately be selected depending on, for example, the configuration of the detector 111, light to be received, or the like. For example, in the case where the detector 111 is an imaging element, the observation optical system 112 may be configured to allow the detector 111 to magnify and image the subject S.

The observation optical system 112 may include an objective lens, for example. That is, an acquisition unit, which is described later, may acquire signals from light from the living tissue through the objective lens. Further, the observation optical system 112 may also include a relay lens for relaying images magnified by the objective lens to the detector 111. The configuration of the observation optical system 112 may be selected depending on the subject S. For example, the magnification of the objective lens may appropriately be selected depending on the subject S, for example. Further, the configuration of the relay lens may appropriately be selected depending on the objective lens and the detector 111, for example. The observation optical system 112 may include optical components other than the objective lens and the relay lens.

(2-3) Detector

The detector 111 includes the acquisition unit and a control unit. The acquisition unit acquires signals from light from the subject S irradiated with light by the irradiation unit. The control unit acquires characteristic data regarding the signals and generates output data on the basis of the characteristic data.

In the case where the detector 111 is an imaging element, the acquisition unit is also referred to as an "imaging unit." In this case, the imaging unit images the subject S irradiated with light by the irradiation unit 113, thereby acquiring pixel signals. For example, the imaging unit images the subject S through the objective lens. The control unit acquires characteristic data regarding the pixel signals obtained by the imaging unit and then controls, on the basis of the characteristic data, output data that is output from the imaging element 111.

In a case where the detector 111 is a photodetector, the acquisition unit acquires optical signals. The control unit acquires characteristic data regarding the optical signals and generates output data on the basis of the characteristic data.

(2-3-1) Control Unit

The acquisition of characteristic data from signals and the control of output data generation based on the characteristic data that are performed by the control unit are described below.

The control unit acquires characteristic data from signals. In a case where the signals are pixel signals, the characteristic data may be, for example, focus state information (for example, focal position information or focus accuracy information), correlation information regarding pixel signals, or spectrum effective region data. With regard to these pieces of characteristic data, see the descriptions in (2-5) and later.

The control unit may acquire the characteristic data regarding the signals by using a learned model. The learned model may be selected depending on characteristic data to be acquired. For example, the learned model may be a learned model obtained by machine learning using at least one but preferably a plurality of pieces of training data including pixel signals obtained by imaging a living tissue and characteristic data associated with the pixel signals.

The learned model may be a learned model generated by deep learning, for example. For example, the learned model may be a multilayer neural network. The learned model may be, for example, a deep neural network (DNN), more specifically, a convolutional neural network (CNN). The multilayer neural network may include an input layer configured to receive signals from light from living tissues (for example, pixel signals obtained by imaging living tissues), an output layer configured to output characteristic data regarding the signals, and at least one, for example, two or more intermediate layers provided between the input layer and the output layer.

Further, as the learned model, an algorithm other than deep learning may be used. As the algorithm, for example, linear regression, MARS (Multivariate adaptive regression splines), or a support vector machine (SVM) may be used. Further, as the algorithm, as a learning method using a tree, a method using a Decision Tree may be employed, or an ensemble learner such as a K-NN (K-Nearest Neighbor) or a Random Forest may be employed.

The control unit generates output data on the basis of the characteristic data. The control unit may generate output data by using a learned model. The control unit may control output data that is output from the detector 111. For example, the control unit may select or generate, on the basis of the characteristic data, output data that is output from the detector 111. The control unit may control, by using a learned model, data that is output from the imaging element.

For example, the learned model may be a learned model obtained by machine learning using at least one but preferably a plurality of pieces of training data including characteristic data associated with signals and output data associated with the characteristic data.

Also, the learned model may be a learned model generated by deep learning, for example. For example, the learned model may be the multilayer neural network. The learned model may be, for example, a deep neural network, more specifically, a convolutional neural network. The multilayer neural network may include an input layer configured to receive characteristic data, an output layer configured to output output data, and at least one, for example, two or more intermediate layers provided between the input layer and the output layer.

(2-3-2) Configuration Example of Detector

In one embodiment of the present technology, the detector 111 may be configured as an imaging element. A configuration example of the detector (imaging element) 111 is described below with reference to FIG. 2. Note that the detector 111 is not limited to an imaging element and may be a photodetector, for example.

As illustrated in FIG. 2, the imaging element 111 includes an imaging block 20 and a signal processing block 30. The imaging block 20 and the signal processing block 30 are electrically connected to each other through connection lines (internal buses) CL1, CL2, and CL3.

The imaging block 20 includes an imaging unit 21, an imaging processing unit 22, an output control unit 23, an output I/F 24, and an imaging control unit 25.

The signal processing block 30 may include a CPU (Central Processing Unit) 31, a DSP (Digital Signal Processor) 32, and a memory 33. The signal processing block 30 may further include a communication I/F 34, an image compression unit 35, and an input I/F 36. The signal processing block 30 performs predetermined signal processing by using pixel signals obtained by the imaging unit. The signal processing block 30 achieves the characteristic data acquisition processing and the control processing of data that is output from the imaging element, which have been described in "(2-1-1) Control unit" above.

These components included in the imaging element 111 are described below.

The imaging unit 21 images the subject S including the living tissue to acquire pixel signals. The imaging unit 21 may be driven by, for example, the imaging processing unit 22 to perform the imaging. The imaging unit 21 may include a plurality of pixels two-dimensionally arrayed, for example. Each pixel included in the imaging unit 21 receives light, performs photoelectric conversion, and then outputs analog pixel signals based on the received light.

The size of images (signals) that are output from the imaging unit 21 can be selected from a plurality of sizes including, for example, 12 M (3968×2976) pixels, VGA (Video Graphics Array) size (640×480 pixels), and the like. Images that are output from the imaging unit 21 may be color images or monochrome images. The color images may be expressed by RGB (red, green, and blue), for example. The monochrome images may be expressed only by luminance, for example. These selections can be made as one type of the photography mode setting.

The imaging processing unit 22 may perform imaging processing related to imaging performed by the imaging unit 21. For example, the imaging processing unit 22 performs, under the control of the imaging control unit 25, imaging processing such as driving of the imaging unit 21, AD (Analog to Digital) conversion of analog image signals output from the imaging unit 21, or imaging signal processing.

More specifically, the imaging signal processing may be, for example, processing of calculating the mean value of pixel values in each predetermined small region of an image that is output from the imaging unit 21 so as to obtain the brightness of each small region, processing of converting images that are output from the imaging unit 21 to HDR (High Dynamic Range) images, defect correction, or developing.

The imaging processing unit 22 may output, as captured images, digital image signals (for example, 12 M pixels or VGA size images) obtained by the AD conversion of analog image signals output from the imaging unit 21, for example.

The captured images that are output from the imaging processing unit 22 may be supplied to the output control unit 23. Further, the captured images that are output from the imaging processing unit 22 may be supplied to the signal processing block 30 (particularly, the image compression unit 35) through the connection line CL2.

The output control unit 23 may receive the captured images supplied from the imaging processing unit 22. Further, the output control unit 23 may receive, for example, results of identification obtained by using captured image data or the like and then supplied from the signal processing block 30 through the connection line CL3.

The output control unit 23 performs output control of controlling the imaging element 111 to selectively output, from the (one) output I/F 24, the captured images supplied from the imaging processing unit 22 and the results of distinction by the signal processing block 30.

That is, the output control unit 23 selects a captured image from the imaging processing unit 22 or an image from the signal processing block 30 and supplies the image to the output I/F 24.

The output I/F 24 is an I/F configured to output captured images supplied from the output control unit 23 and distinction results to the outside. As the output I/F 24, for example, a relatively high-speed parallel I/F such as MIPI (Mobile Industry Processor Interface) can be employed. The output I/F 24 outputs, under the output control of the output control unit 23, captured images from the imaging processing unit 22 or images from the signal processing block 30, to the outside. Thus, for example, in a case where an external component only needs images from the signal processing block 30 and does not need captured images from the imaging processing unit 22, only the images from the signal processing block 30 can be output, and hence, the amount of data that is output from the output I/F 24 to the outside can be reduced.

Further, the signal processing block 30 performs characteristic data acquisition and/or data output control and outputs, from the output I/F 24, images that are transmitted to components outside the imaging element 111 (for example, information processing apparatus). With this, signal processing outside the imaging element 111 does not need to be performed, and loads on the external components can thus be reduced.

The imaging control unit 25 may control the imaging processing unit 22 on the basis of imaging information stored in a register group 27, thereby controlling imaging performed by the imaging unit 21.

The register group 27 can store imaging information, results of imaging signal processing by the imaging processing unit 22, and output control information regarding output control by the output control unit 23. The output control unit 23 can perform, on the basis of the output control information stored in the register group 27, output control of controlling the imaging element to selectively output captured images from the imaging processing unit 22 or images from the signal processing block 30.

The imaging control unit 25 and the CPU included in the signal processing block 30 may be connected to each other through the connection line CL1. The CPU can write/read information in/from the register group 27 through the connection line CL1. That is, the communication I/F 26 or the CPU may write/read information in/from the register group 27. Moreover, the control unit 25 (or more generally "control unit" as referred to in this document is circuitry (programmable, hardwired, or a combination) that is configured by software or hardwired interconnections (e.g., an ASIC) to perform the prescribed functions. A computer, microcontroller, CPU and the like are example circuitry used herein as examples of control unit implementations.

The signal processing block 30 controls data output on the basis of the characteristic data acquisition and/or the characteristic data. The signal processing block 30 may include, for example, the CPU (Central Processing Unit) 31, the DSP (Digital Signal Processor) 32, and the memory 33. The signal processing block 30 may further include the communication I/F 34, the image compression unit 35, and the input I/F 36. The signal processing block 30 may perform predetermined signal processing by using pixel signals obtained by the imaging unit 21.

The CPU 31, the DSP 32, the memory 33, the communication I/F 34, and the input I/F 36 included in the signal processing block 30 are circuitry connected to each other through a bus such that they can exchange information therebetween, as necessary.

The CPU 31 performs, by executing programs stored in the memory 33 (i.e., the programs configure the CPU to perform), various types of processing such as the control of the signal processing block 30 or the writing/reading of information in/from the register group 27 of the imaging control unit 25. For example, by executing a program, the CPU 31 may function as an imaging information calculation unit configured to calculate imaging information by using a signal processing result obtained by signal processing by the DSP 32. The CPU 31 may feed new imaging information calculated by using the signal processing result back to the register group 27 of the imaging control unit 25 through the connection line CL1 such that the register group 27 stores the signal processing result. Thus, the CPU 31 can control, on the basis of results of signal processing on captured images, imaging performed by the imaging unit 21 and/or imaging signal processing by the imaging processing unit 22. Further, imaging information stored in the register group 27 under the control of the CPU 31 can be provided (output) to the outside from the communication I/F 26. For example, focus information of imaging information stored in the register group 27 can be provided to a focus driver (not illustrated) for focus control from the communication I/F 26.

The DSP 32 functions, by executing a program stored in the memory 33, as a signal processing unit configured to perform signal processing by using image data supplied from the imaging processing unit 22 to the signal processing block 30 through the connection line CL2 or information received by the input I/F 36 from the outside.

The memory 33 may include an SRAM (Static Random Access Memory), a DRAM (Dynamic RAM), or the like. The memory 33 stores various types of data such as data that is used for processing by the signal processing block 30.

For example, the memory 33 stores programs received from the outside through the communication I/F 34, captured image data compressed by the image compression unit 35, particularly, captured image data that is used in signal processing by the DSP 32, signal processing results obtained as a result of signal processing by the DSP 32, or information received by the input I/F 36.

The communication I/F 34 is a second communication I/F that is, for example, a serial communication I/F such as an SPI (Serial Peripheral Interface), and exchanges necessary information such as programs that are executed by the CPU 31 or the DSP 32, with external components (for example, a memory or information processing apparatus outside the imaging element 111).

For example, the communication I/F 34 downloads programs that are executed by the CPU 31 or the DSP 32, from the outside, and supplies the programs to the memory 33 such that the memory 33 stores the programs. Thus, with the programs downloaded by the communication I/F 34, the CPU 31 or the DSP 32 can execute various types of processing. Note that the communication I/F 34 can exchange not only the programs but also any data with external components. For example, the communication I/F 34 can output signal processing results obtained by signal processing by the DSP 32 to the outside. Further, the communication I/F 34 can output information based on instructions from the CPU 31 to an external apparatus, thereby enabling the control of the external apparatus based on the instructions from the CPU 31.

Here, signal processing results obtained by signal processing by the DSP 32 can be written by the CPU 31 in the register group 27 of the imaging control unit 25, as well as being output from the communication I/F 34 to the outside. The signal processing results written in the register group 27 can be output from the communication I/F 26 to the outside. Processing results of processing performed by the CPU 31 are similar to those described above.

The image compression unit 35 receives captured images supplied from the imaging processing unit 22 through the connection line CL2. The image compression unit 35 performs compression processing of compressing the captured images to generate compressed images smaller in amount of data than the captured images.

The compressed images generated by the image compression unit 35 are supplied to the memory 33 through the bus to be stored therein.

Here, signal processing by the DSP 32 can be performed using, in addition to captured images themselves, compressed images generated by the image compression unit 35 from the captured images. Since the compressed images are smaller in amount of data than the captured images, the load of signal processing by the DSP 32 can be reduced, and the storage capacity of the memory 33 configured to store compressed images can be saved.

As compression processing by the image compression unit 35, for example, downscaling can be performed to convert captured images having 12 M (3968×2976) pixels to VGA size images. Further, in a case where signal processing by the DSP 32 is performed in terms of luminance and captured images are RGB images, as compression processing, YUV conversion can be performed to convert the RGB images to YUV images, for example.

Note that the image compression unit 35 can be achieved by software or dedicated hardware.

The input I/F 36 is an I/F configured to receive information from the outside. The input I/F 36 receives, for example, output of an external sensor (external sensor output) from the external sensor and supplies the output to the memory 33 through the bus such that the memory 33 stores the output.

As the input I/F 36, for example, a parallel I/F such as an MIPI (Mobile Industry Processor Interface) can be employed, similarly to the output I/F 24.

Further, as the external sensor, for example, a distance sensor configured to sense distance information can be employed. In addition, as the external sensor, for example, an image sensor configured to sense light and output images corresponding to the light, that is, an image sensor different from the imaging element 111, can be employed.

The DSP 32 can perform signal processing by using, in addition to captured images (compressed images generated from the captured images), external sensor output received by the input I/F 36 from the external sensor as described above to be stored in the memory 33.

In the one-chip imaging element 111 configured as described above, signal processing using pixel signals obtained by imaging performed by the imaging unit 21 (for example, captured images or compressed images generated from the captured images) is performed by the DSP 32, and signal processing results of the signal processing and the pixel signals are selectively output from the output I/F 24. Thus, an apparatus including the imaging element 111 can be reduced in size.

Here, in the imaging element 111, in a case where the DSP 32 does not perform signal processing and the imaging element 111 thus outputs captured images without outputting signal processing results, that is, in a case where the imaging element 111 is configured as an image sensor that only captures and outputs images, the imaging element 111 can only include the imaging block 20 without the output control unit 23.

FIG. 3 is a perspective view illustrating an overview of an appearance configuration example of the imaging element 111 of FIG. 2.

The imaging element 111 can be configured as, for example, a one-chip semiconductor apparatus having a stack structure with a plurality of stacked dies, as illustrated in FIG. 3.

In FIG. 3, the imaging element 111 includes two stacked dies 51 and 52.

In FIG. 3, the imaging unit 21 is mounted on the die 51 on the upper side, and the imaging processing unit 22 to the imaging control unit 25 and the CPU 31 to the input I/F 36 are mounted on the die 52 on the lower side. The die 51 on the upper side and the die 52 on the lower side are electrically connected to each other, for example, with a through hole formed to pass through the die 51 and reach the die 52, or with Cu—Cu bonding directly connecting Cu wiring exposed on the lower surface of the die 51 and Cu wiring exposed on the upper surface of the die 52 to each other.

In this way, in the present technology, the imaging unit and the control unit may be disposed in the single semiconductor chip.

Here, in the imaging processing unit 22, as the AD conversion method for image signals that are output from the imaging unit 21, for example, a column-parallel AD method or an area AD method can be employed.

In the column-parallel AD method, for example, ADCs (AD Converters) are provided for the columns of the pixels included in the imaging unit 21, and the ADC in each column performs AD conversion on pixel signals from pixels in the corresponding column, so that, with regard to a row, AD conversion on image signals from pixels in each column is performed in parallel. In a case where the column-parallel AD method is employed, the imaging processing unit 22 configured to perform AD conversion by the column-parallel AD method is partly mounted on the die 51 on the upper side in some cases.

In the area AD method, the pixels included in the imaging unit 21 are grouped into a plurality of blocks, and an ADC is provided for each block. Further, the ADC for each block performs AD conversion on pixel signals from pixels in the corresponding block, so that AD conversion on image signals from pixels in the plurality of blocks is performed in parallel. In the area AD method, with a block as a minimum unit, AD conversion (readout and AD conversion) can be performed on image signals only from necessary pixels among the pixels included in the imaging unit 21.

Note that, when the imaging element 111 having a large area is allowable, the imaging element 111 can be configured with one die.

Further, in FIG. 3, the one-chip imaging element 111 includes the two stacked dies 51 and 52, but the one-chip imaging element 111 can include three or more stacked dies. For example, in a case where the one-chip imaging element 111 includes three stacked dies, the memory 33 of FIG. 3 can be mounted on another die.

(2-4) Other Components

The stage 114 may be configured to be movable in a plane perpendicular to the optical axis direction (focus direction) of the objective lens included in the observation optical system 112, for example. The plane may be what is called an X-Y plane.

Further, the stage 114 may be movable in the optical axis direction of the objective lens included in the observation optical system 112, for example. The optical axis direction is also referred to as an "X direction."

The stage 140 holds the subject S. For example, the subject S may be placed on the stage 140, or the subject S may be attached to the stage 140. The stage 140 may be configured to be movable. The movement of the stage 140 may be controlled by a control unit 130, for example.

The signal acquisition apparatus 100 may further include an output unit (not illustrated). The output unit may be a display apparatus, for example. The output unit may output, for example, output data output from the detector (for example, image data). Further, the output unit may output characteristic data acquired by the control unit.

The signal acquisition apparatus 100 may further include an input unit (not illustrated). The input unit receives, for example, the input of data from a user and the input of data that is used in signal acquisition processing. The input unit may receive, for example, the input of training data for generating learned models.

The signal acquisition apparatus 100 may further include an analysis unit (not illustrated). The analysis unit may analyze output data output from the detector (for example, image data). The analysis unit may be configured as an information processing apparatus described later, for example.

(2-5) First Example of Signal Acquisition Processing (Image Acquisition Using Focus State Information)

For example, in a case where a bio-derived subject is to be imaged by an image acquisition apparatus such as a digital pathology scanner, position adjustment is made through auto focus processing such that the position of the subject matches a focal position in some cases. To perform the auto focus processing, it is conceivable that image data is transmitted from an imaging element to a control apparatus, and the control apparatus determines, on the basis of a predetermined algorithm, to move a stage. However, the transmission takes time in some cases. In addition, the speed of the transmission may depend on the output interface of the imaging element. Further, latency may be produced due to the transmission.

The signal acquisition apparatus according to the present technology includes the control unit configured to acquire characteristic data regarding signals and control the generation of output data on the basis of the characteristic data. In the case where the detector included in the signal acquisition apparatus according to the present technology is an imaging element, as the characteristic data, for example, focus state information, in particular, focal position data is acquired, so that focus adjustment is achieved.

Further, for example, since the acquisition unit and the control unit are disposed in the single semiconductor chip, there is no need to transmit image data from the detector (imaging element) to an external control apparatus in auto focus processing. Thus, the problem that arises upon image data transmission, which has been described above, can be eliminated.

An example of focus adjustment by the signal acquisition apparatus according to the present technology is described below with reference to FIG. 4 and FIG. 5. FIG. 4 is a block diagram of an example of the signal acquisition apparatus according to the present technology that is configured as an image acquisition apparatus. FIG. 5 is a flow chart illustrating an example of processing that is performed by the image acquisition apparatus according to the present technology.

(2-5-1) Configuration Example of Signal Acquisition Apparatus

An image acquisition apparatus 400 illustrated in FIG. 4 includes a detector (that is, an imaging element) 411, a stage control unit 415, and a stage 414. The image acquisition apparatus 400 includes an irradiation unit (not illustrated) configured to irradiate a living tissue (hereinafter also referred to as the "subject S") placed on the stage 414 with light; and an observation optical system (not illustrated) for magnifying the subject S for observation. The observation optical system includes an objective lens.

The image acquisition apparatus 400 may be configured as a microscope apparatus, for example.

The imaging element 411 includes an imaging unit 425 configured to acquire pixel signals by imaging the subject S. The imaging element 411 includes a control unit 424 configured to acquire characteristic data regarding pixel signals obtained by the imaging and generate output data on the basis of the characteristic data. The imaging unit 425 and the control unit 424 may be disposed in a single semiconductor chip, for example. The imaging element 411 may be, for example, the imaging element described in "(2-3-2) Configuration example of detector" above but is not limited thereto.

The stage 414 is configured to hold the subject S. For example, the stage 414 may be a stage on which the subject S can be mounted. The stage 414 can be moved by the stage control unit 415 in any of the X-axis direction, the Y-axis direction, or the Z-axis direction. The stage 414 may be an X-Y stage, for example.

The stage control unit 415 drives the movement of the stage 414. The stage control unit 415 can move the stage 414 in the optical axis direction of the objective lens of the observation optical system (focus direction; also referred to as a "Z axis"). Further, the stage control unit 415 can also move the stage 414 in a plane perpendicular to the optical axis direction of the objective lens, and, for example, the stage control unit 415 can move the stage 414 in the X-axis direction and Y-axis direction perpendicular to the optical axis. The X-axis direction and the Y-axis direction cross each other perpendicularly.

The imaging element 411 includes the control unit 424. The control unit acquires characteristic data regarding pixel signals obtained by the imaging element 411. The characteristic data may be focus state information upon imaging performed by the imaging element 411 and may be focal position data, for example. The focus state information may be used when the image acquisition apparatus 400 is controlled to focus on the subject S.

The focus state information may be focus state information regarding at least some of the pixel signals. That is, the focus state information may be focus state information regarding some of the pixel signals or focus state information regarding all the signals. By acquiring the focus state information regarding some of the signals as characteristic data, in processing described later, for example, a region including a region of interest (for example, a target cell, more specifically, a cancer cell or the like) in the subject S can be brought into focus. Further, the focus state information regarding all the signals can be used as characteristic data.

The focal position data may be, for example, the focal position of the imaging, the amount of blur of the pixel signals, or the amount of deviation of the focal position from an in-focus position, or the focal position data may be distance data that is used for identifying the focal position information or the amount of deviation.

The focal position is focal position information and may be optimum focal position information, for example. The focal position may be, for example, information regarding the focal position of the observation optical system (particularly, the objective lens included in the observation optical system).

The amount of blur of the pixel signals is the amount of out-of-focus pixel signals among all the pixel signals.

The amount of deviation is the amount of deviation of the focal position of the imaging from the in-focus position. Instead of this amount of deviation, for example, the amount of deviation between a current position of the subject S and the focal position of the observation optical system (particularly, the focal position of the objective lens included in the observation optical system) may be employed. The amount of deviation between a current position of the subject S and an optimum focal position of the observation optical system may preferably be employed. These amounts of deviation may each be, for example, the amount of deviation in the optical axis direction (focus direction) of the observation optical system (particularly, objective lens).

The distance data may be, for example, a distance between the observation optical system (particularly, objective lens) and the subject S or a distance between the observation optical system (particularly, objective lens) and the stage.

The control unit preferably acquires the focus state information by using a learned model. The learned model may be a learned model generated by deep learning, for example. The learned model may include, for example, an input layer configured to receive pixel signals obtained by imaging living tissues, an output layer configured to output focus state information on the basis of the pixel signals, and at least one intermediate layer provided between the input layer and the output layer.

The control unit preferably acquires the focus state information on the basis of one pixel signal. That is, the focus state information is acquired from one piece of imaging data obtained by imaging the subject S once. For example, the control unit can acquire focus state information from one pixel signal by using the learned model.

The learned model may be, for example, a learned model obtained by machine learning using one or a plurality of pieces of training data including combinations of pixel signals obtained by imaging a living tissue and focus state information regarding the pixel signals (particularly, focal position information or the amount of deviation between a current position of the subject S and a focal position).

An example of how to generate a learned model is described with reference to FIG. 6.

As illustrated on the left of FIG. 6, N (N is an integer of 1 or more) microscope slides SG each having placed thereon a bio-derived subject S1, which is similar to the subject S, are prepared. For example, one or more, preferably two or more, more preferably three or more microscope slides may be prepared.

One of the prepared N microscope slides is imaged at a plurality of positions in the optical axis direction of the objective lens (also referred to as the "Z-axis direction") to obtain an imaging data group (pixel signal group). The plurality of different positions in the Z-axis direction is, as illustrated on the right of FIG. 6, for example, a plurality of positions in a range of +4 to −4 μm in the Z-axis direction from an in-focus position in the Z-axis direction (a position at which an image "0" has been imaged in FIG. 6). For example, imaging may be performed at respective positions shifted by 0.4 μm, and in this case, 21 pieces of imaging data are obtained in total. In a similar manner, a plurality of pieces of imaging data regarding other microscope slides is obtained. With this, for example, N×21 pieces of imaging data are obtained.

With regard to each piece of imaging data, a distance from the in-focus position in the Z-axis direction (that is, the amount of deviation between the current position of the subject and the focal position) is known. Thus, the amount of deviation is assigned to each piece of imaging data. With this, a combination of imaging data and the amount of deviation associated with the imaging data is created, and a plurality of such combinations is obtained. The plurality of combinations is used as training data for generating a learned model.

As described above, in the present technology, the learned model may be generated by using, as training data, one or a plurality of combinations of imaging data and focus state information associated with the imaging data (for example, the amount of deviation of a current position of the subject from a focal position or focal position information).

The learned model is preferably a learned model generated by deep learning. For example, the learned model may be a learned model obtained by machine learning using the training data with a multi-class problem or a linear regression problem. With regard to the multi-class problem, the number of classifications may be 2 to 50, preferably 3 to 30, more preferably 5 to 20, for example.

For example, the learned model may be the multilayer neural network. The learned model may be, for example, the deep neural network (DNN), more specifically, the convolutional neural network (CNN). The learned model may preferably be a learned model including an input layer configured to receive imaging data and an output layer configured to output characteristic data (particularly, focus state information) in the imaging data. The learned model includes at least one intermediate layer between the input layer and the output layer. The number of intermediate layers may be, for example, 1 to 10, preferably 2 to 10, more preferably 2 to 5.

Further, the control unit 424 may drive the stage control unit 415 of the image acquisition apparatus 400, thereby moving the stage 414.

The control unit can drive, for example, the stage control unit 415 to move the stage 414 in the optical axis direction of the objective lens, thereby bringing the subject S into focus. Note that the control unit 424 may control the observation optical system of the image acquisition apparatus 400, thereby bringing the subject S into focus.

The control unit 424 can drive, for example, the stage control unit 415 to move the stage 414 in the direction perpendicular to the optical axis of the objective lens, thereby changing imaging regions. For example, as illustrated in FIG. 7, a region R including the entire subject S may be divided into tiles, and the respective divided regions may be sequentially imaged through changing the imaging regions by the control unit.

(2-5-2) Example of Signal Acquisition Processing Flow

An example of signal acquisition processing (image acquisition processing) for the subject S performed by the image acquisition apparatus 400 is described below with reference to FIG. 5.

In Step S101 of FIG. 5, the image acquisition processing using the image acquisition apparatus according to the present technology starts. Prior to the start of the processing, the subject S, which is bio-derived, is placed on the stage 414. The stage 414 is disposed at a position that allows the image acquisition apparatus 400 to image the subject S.

In a signal acquisition step of Step S102, the image acquisition apparatus 400 acquires signals from light from a living tissue irradiated with light. More specifically, in the signal acquisition step, the image acquisition apparatus 400 images the subject S. The imaging is performed as follows, for example.

In Step S102, an illumination unit (not illustrated) irradiates the subject S on the stage 414 with light. A light source included in the illumination unit may appropriately be selected by persons skilled in the art depending on the types of image data to be acquired by the imaging element 411. The light source may include, for example, at least one of a halogen lamp, an LED lamp, a mercury lamp, or a xenon lamp. For example, in a case where the image data is bright field image data, the illumination unit may include, for example, an LED lamp or a halogen lamp. In a case where the image data is fluorescent image data, the illumination unit may include, for example, a laser light source, an LED lamp, a mercury lamp, or a xenon lamp. In Step S102, a processing unit (not illustrated) or a user may control the illumination unit to emit the light.

In Step S102, the imaging unit 425 images, in the state where the subject S is being irradiated with the light, the subject S through an observation optical system (not illustrated), thereby acquiring a signal (pixel signal). The pixel signal may be a pixel signal corresponding to the entire subject S or a part of the subject S. For example, as illustrated in FIG. 7, the imaging element 411 may image, with regard to the region R including the subject S and divided into tiles, one of the tiles of the region R.

For example, the imaging unit 425 may image a divided region R1 illustrated in FIG. 7. The divided region R1 may be imaged once or more, and the divided region R1 is preferably imaged once. This is because the control unit 424 can acquire focus state information from one pixel signal by using the learned model in a characteristic data acquisition step described below.

In the characteristic data acquisition step of Step S103, the control unit 424 acquires focus state information as characteristic data regarding the pixel signal, on the basis of the pixel signal acquired in Step S102, particularly, on the basis of one pixel signal. The focus state information may be, for example, focal position information or the amount of deviation between a focal position and a current position of the subject S (particularly, the amount of deviation in the optical axis direction or the amount of deviation in the focus direction of the objective lens).

In Step S103, the control unit 424 preferably acquires the focus state information on the basis of the pixel signal, by using a learned model. The learned model may be generated, as training data, by using one or a plurality of combinations of image data regarding a subject including a living tissue and the characteristics of the subject, for example.

In Step S104, the control unit 424 generates output data on the basis of the focus state information acquired in Step S103 as the characteristic data. The output data is output from the imaging element 411. A specific example of the control is described below.

The control unit determines whether to execute focus adjustment on the basis of the focus state information. For example, the control unit determines whether to perform, on the basis of the focus state information, the movement of the stage 414 for bringing the subject S into focus (particularly, the movement in the optical axis direction (Z-axis direction)) or the movement of the observation optical system. The determination may be made on the basis of, for example, whether the amount of deviation of the current position of the subject from the focal position falls within a predetermined numerical range. The predetermined numerical range may appropriately be set by persons skilled in the art or users and may be set on the basis of desired image quality or performance of the observation optical system, for example.

In a case where the control unit has determined to execute focus adjustment, the control unit executes focus adjustment on the basis of the focus state information, and then, the imaging element images the subject S at a position where the focus adjustment is executed. The control unit generates the output data (for example, image data) on the basis of a pixel signal obtained by imaging at the position where the focus adjustment is executed.

For example, the control unit drives the stage control unit 415 to move the stage 414 in the optical axis direction of the objective lens, thereby bringing the subject S into focus. In a case where the focus state information is the amount of deviation, the amount of the movement is the amount of movement that eliminates the amount of deviation. Further, in a case where the focus state information is focal position information, the amount of the movement is the amount of movement with which the subject S is moved to the focal position.

After the control unit has executed the focus adjustment, the control unit drives the imaging unit 425 to image the subject S. With this, the imaging element 411 obtains imaging data in which the subject S is in focus.

The control unit controls the imaging element 411 to output the imaging data in which the subject S is in focus, to the outside (for example, the information processing apparatus 430 connected to the image acquisition apparatus 400 with a cable or wirelessly). In this case, the pixel signal acquired in Step S102 may not be output. With this, the amount of data that is output from the imaging element 411 to outside the imaging element 411 is reduced, so that the speed-limiting effect of the output interface or the effect of communication speed is reduced.

In a case where the control unit 424 has determined not to execute focus adjustment, the pixel signal acquired in Step S102 is a pixel signal acquired by imaging the subject S in focus. Thus, in the above-mentioned case, the control unit 424 controls the imaging element 411 to output the output data (for example, image data) generated on the basis of the pixel signal acquired in Step S102, to the outside (for example, the information processing apparatus 430 connected to the image acquisition apparatus 400 with a cable or wirelessly).

As described above, the control unit 424 generates, in Step S104, the output data on the basis of the focus state information. After the output data based on the pixel signal has been output in Step S104, the control unit advances the processing to Step S105.

In Step S105, the control unit 424 determines whether to end the image acquisition processing. For example, the control unit 424 may determine whether there is a divided region to be imaged among the divided regions obtained by dividing the region R as the imaging target.

In a case where there is a divided region to be imaged, the control unit returns the processing to Step S102 and executes Step S102 to Step S104 on the divided region to be imaged. Step S102 to Step S104 are repeated to acquire pixel signals and output data for the entire region R.

In a case where there is no divided region to be imaged (for example, in a case where all the divided regions of the region R have been subjected to the image acquisition processing), the control unit advances the processing to Step S106.

In Step S106, the control unit ends the image acquisition processing.

Through the above-mentioned image acquisition processing, high-speed auto focus processing is achieved. Further, through the above-mentioned image acquisition processing, the problem that arises upon image data transmission from an imaging element to an external control apparatus, which has been described above, can be eliminated.

(2-5-3) Another Example of Output Data Control

In Step S104 described in (2-5-2) above, in the case where it has been determined to execute focus adjustment, imaging is performed at the position where the focus adjustment is executed, and the data based on the pixel signal acquired by the imaging is output from the imaging element 411. The output data based on the pixel signal acquired in Step S102 is, however, not output.

According to an alternative embodiment of the present technology, in Step S104, the output data based on the pixel signal acquired by imaging at the position where the focus adjustment is executed in Step S104 (hereinafter also referred to as a "second pixel signal") and the output data based on the pixel signal acquired in Step S102 (hereinafter also referred to as a "first pixel signal") may both be output from the imaging element 411. Output data control by the control unit in the embodiment is described below.

In Step S104, the control unit 424 determines whether to execute focus adjustment on the basis of the characteristic data acquired in Step S103. For example, the control unit 424 determines whether to perform, on the basis of the characteristic data, the movement of the stage 414 (particularly, the movement in the optical axis direction (Z-axis direction)) or the movement of the observation optical system.

The characteristic data may include focus state information, for example. The description in (2-5-2) above can be applied to the focus state information.

In the embodiment, the characteristic data may include characteristic data associated with the subject S and may include characteristics associated with the attributes of the subject S, for example. The characteristics associated with the attributes of the subject S may include characteristics associated with, for example, the type of a living thing from which the subject S is derived, the type of the subject S, the tissue structure of the subject S, the types or sizes of the cells included in the subject S, or a disease that the subject S may have.

In a case where the control unit has determined to execute focus adjustment, the control unit executes focus adjustment on the basis of the characteristic data, and then, the imaging element images the subject S at a position where the focus adjustment is executed.

For example, the control unit drives the stage control unit 415 to move the stage 414 in the optical axis direction of the objective lens, thereby bringing the subject S into focus. In a case where the focus state information is the amount of deviation, the amount of the movement is the amount of movement that eliminates the amount of deviation. Further, in a case where the focus state information is focal position information, the amount of the movement is the amount of movement with which the subject S is moved to the focal position.

Further, the control unit may perform the focus adjustment by driving the stage control unit 415 on the basis of the characteristic data associated with the subject S. For example, the focus adjustment is performed on the basis of the tissue structure of the subject S, the sizes of the cells included in the subject S, or the like.

After the control unit has executed the focus adjustment, the control unit drives the acquisition unit (imaging unit) 425 to image the subject S. With this, the imaging element 411 obtains imaging data regarding the subject S imaged at the position where the focus adjustment is executed.

The control unit generates output data on the basis of the first pixel signal obtained by the imaging in Step S102 and the second pixel signal obtained by imaging at the position where the focus adjustment is executed in Step S104. The control unit 424 controls the imaging element 411 to output the generated output data to the outside (for example, the information processing apparatus 430 connected to the image acquisition apparatus 400 with a cable or wirelessly).

In a case where the control unit 424 has determined not to execute focus adjustment, the control unit 424 controls the imaging element 411 to output the output data based on the pixel signal acquired in Step S102, to the outside.

As described above, in Step S104, the control unit 424 controls, on the basis of the focus state information, the generation of data that is output from the imaging element 411. After the output data based on the pixel signal has been output in Step S104, the control unit advances the processing to Step S105.

In the present technology, the control unit 424 may acquire further characteristic data on the basis of the pixel signal obtained by the imaging in Step S104. Further, the control unit 424 may determine whether to execute further focus adjustment on the basis of the further characteristic data. In a case where the control unit 424 has determined to execute further focus adjustment, the control unit 424 executes focus adjustment on the basis of the further characteristic data, and then, the imaging element images the imaging target at a position where the focus adjustment is executed. By the imaging, an additional pixel signal based on imaging at a different position (particularly, a different position in the optical axis direction) is obtained. In Step S104, output data may be generated on the basis of the first pixel signal, the second pixel signal, and the additional pixel signal. Note that processing of acquiring the additional pixel signal may be performed once or a plurality of times.

In a case where the control unit 424 has determined not to execute further focus adjustment, the control unit 424 advances the processing to Step S105.

Through the above-mentioned processing, for example, it is determined whether to perform imaging at a plurality of different positions in the optical axis direction. For example, it is determined whether to acquire Z-stack images. With this, the image acquisition apparatus according to the present technology can acquire Z-stack images only in a case where it is considered necessary.

(2-6) Second Example of Signal Acquisition Processing (Image Acquisition Processing in which Imaging is Performed a Plurality of Times)

As described in "(1) Description of first embodiment" above, as the amount of image data that is used for a pathological diagnosis or the like increases, it takes a longer time to transmit the data, and the speed-limiting effect of transmission interfaces becomes greater. For example, in Z-stacking that is used for the observation of thick histological sections or the like, a plurality of images in a Z-axis direction is acquired. Thus, the amount of data is likely to be large.

The signal acquisition apparatus according to the present technology performs light reception itself for a short period of time and reduces the amount of data obtained by imaging in the imaging element such that a smaller amount of data can be output to outside the imaging element. Therefore, the signal acquisition apparatus according to the present technology can process a massive amount of data at a higher speed and is thus suitable for Z-stacking imaging.

An example of image compression processing and an example of auto focus processing by the signal acquisition apparatus according to the present technology are described below with reference to FIG. 8.

(2-6-1) Configuration Example of Signal Acquisition Apparatus

FIG. 8 illustrates a signal acquisition apparatus 800 according to the present technology that is configured as an image acquisition apparatus. A signal acquisition apparatus (image acquisition apparatus) 500 includes a detector (that is, an imaging element) 511, an observation optical system 512, a stage 514, and a stage control unit 515. The image acquisition apparatus 500 further includes an irradiation unit (not illustrated) configured to irradiate a living tissue (subject S) placed on the stage 514 with light. The image acquisition apparatus 500 may be configured as a microscope apparatus, for example.

The descriptions in (2-1) to (2-3) above are applied to the imaging element 511, the irradiation unit, and the observation optical system 512. The descriptions of the stage 414 and the stage control unit 415 in "(2-5-1) Configuration example of signal acquisition apparatus" above are applied to the stage 514 and the stage control unit 515.

The imaging element 511 includes an acquisition unit (also referred to as an "imaging unit") 525. The imaging unit 525 acquires signals from light from the living tissue at a plurality of positions in the optical axis direction upon imaging performed by the imaging element 511. More specifically, the imaging unit 525 images the subject S at the plurality of positions in the optical axis direction upon imaging performed by the imaging unit 525. With this, a signal set (more specifically, pixel signal set) is obtained. To perform imaging at the plurality of positions, the stage control unit 515 moves the stage 514 in the optical axis direction. The imaging is preferably performed while the stage 514 is moved.

The imaging element 511 includes a control unit 524. The control unit 524 acquires characteristic data regarding pixel signals obtained by the imaging unit 525. The characteristic data is correlation information regarding signals or focus state information (for example, focus accuracy information).

The correlation information regarding pixel signals may be a correlation based on a luminance value distribution, for example, but is not limited thereto.

The focus state information is focus accuracy information, for example. The focus accuracy information may be a focus detection value, for example, but is not limited thereto. Examples of the focus detection value include a phase difference, a high frequency component amount, and a contrast value.

The control unit 524 preferably acquires the correlation information regarding pixel signals or the focus state information by using a learned model. The learned model may be a learned model generated by deep learning, for example. The learned model may include, for example, an input layer configured to receive pixel signals obtained by imaging bio-derived imaging targets, an output layer configured to output correlation information regarding the pixel signals or the focus state information, and at least one intermediate layer provided between the input layer and the output layer.

It is preferred that the imaging unit 525 image the imaging target S at a plurality of positions in the optical axis direction upon imaging performed by the imaging unit 525 and that the control unit 524 acquire correlation information regarding pixel signals or focus state information from a pixel signal set obtained by imaging at the plurality of positions. For example, the control unit 524 can acquire, by using the learned model, correlation information regarding pixel signals or focus state information from a plurality of pixel signals.

The learned model may be, for example, a learned model obtained by machine learning using one or a plurality of pieces of training data including combinations of a plurality of pixel signals obtained by imaging a living tissue and correlation information regarding the plurality of pixel signals or focus state information.

An example of how to generate a learned model in a case where the focus state information is a focus detection value is described below.

By the imaging element 511, a living tissue is imaged a plurality of times to obtain a pixel signal set. The imaging is performed the plurality of times through the objective lens while the imaging target is moved in the optical axis direction of the objective lens. A focus detection value is acquired from the pixel signal set, and a data set including the pixel signal set and the focus detection value is obtained. The focus detection value may be acquired by a method known in the art. In a similar manner, data sets including a plurality of pieces of imaging data and focus detection values are obtained for regions other than the imaging region imaged the plurality of times and/or subjects other than the imaging target.

The plurality of data sets thus obtained is used as training data for generating a learned model.

As described above, in the present technology, the learned model may be generated, as training data, by using one or a plurality of data sets including signal sets (particularly, pixel signal sets) and correlation information associated with the signal sets or focus state information.

The learned model is preferably a learned model generated by deep learning. For example, the learned model may be the multilayer neural network. The learned model may be, for example, the deep neural network (DNN), more specifically, the convolutional neural network (CNN). The learned model may preferably be a learned model including an input layer configured to receive imaging data and an output layer configured to output characteristic data (particularly, correlation information or focus accuracy) in the imaging data. The learned model includes at least one intermediate layer between the input layer and the output layer. The number of intermediate layers may be, for example, 1 to 10, preferably 2 to 10, more preferably 2 to 5.

The control unit 524 may drive the stage control unit 515 of the image acquisition apparatus 500 to move the stage 514.

The control unit 524 can drive, for example, the stage control unit 515 to move the stage 514 in the optical axis direction of the observation optical system 512 (particularly, the optical axis direction of the objective lens), thereby bringing the subject S into focus. Note that the control unit may control the observation optical system 512 of the image acquisition apparatus 500, thereby bringing the subject S into focus.

The control unit 524 can drive, for example, the stage control unit 515 to move the stage 514 in the direction perpendicular to the optical axis of the observation optical system 512, thereby changing imaging regions. For example, as illustrated in FIG. 7, the region R including the entire subject S may be divided into tiles, and the respective divided regions may be sequentially imaged through changing the imaging regions by the control unit.

(2-6-2) Example of Signal Acquisition Processing Flow (Compressed Image Acquisition)

An example of signal acquisition processing (image acquisition processing) for the subject S performed by the image acquisition apparatus 500 is described below with reference to FIG. 5.

In Step S101 of FIG. 5, the image acquisition processing using the image acquisition apparatus according to the present technology starts. Prior to the start of the processing, a living tissue (subject S) is placed on the stage 514. The stage 514 is disposed at a position that allows the image acquisition apparatus 500 to image the subject S.

In the imaging step of Step S102, the image acquisition apparatus 500 images the subject S a plurality of times. The imaging is performed as follows, for example.

In Step S102, the irradiation unit irradiates the subject S on the stage 514 with light. A light source included in the irradiation unit may appropriately be selected by persons skilled in the art depending on the types of image signals to be acquired by the imaging element 511. The light source may include, for example, at least one of a halogen lamp, an LED lamp, a mercury lamp, or a xenon lamp. For example, in a case where the image data is bright field image data, the irradiation unit may include, for example, an LED lamp or a halogen lamp. In a case where the image data is fluorescent image data, the irradiation unit may include, for example, a laser light source, an LED lamp, a mercury lamp, or a xenon lamp. In Step S102, the control unit 524 or a user may control the irradiation unit to emit the light.

In Step S102, the imaging unit 525 continuously images, in the state where the subject S is being irradiated with the light, the subject S the plurality of times while the stage 514 is moved in the optical axis direction of the objective lens, thereby acquiring a plurality of pixel signals. The plurality of pixel signals is used in Step S103 as a pixel signal set. The pixel signal set may include image signals corresponding to the entire subject S or a part of the subject S. For example, as illustrated in FIG. 7, the imaging element 511 may image, with regard to the region R including the subject S and divided into tiles, one of the tiles of the region R.

The imaging may be performed the plurality of times in Step S102 under the control of the control unit 524 included in the imaging element 511.

In Step S102, the imaging element 511 preferably images the subject S the plurality of times while the stage 514 is moved at a constant speed. The stage 514 may be moved at the constant speed by, for example, the control unit 524 driving the stage control unit 515.

In the characteristic data acquisition step of Step S103, the control unit 524 acquires correlation information regarding the pixel signal set as characteristic data, on the basis of the image signal set acquired in Step S102. The correlation may be a correlation based on a luminance value distribution, for example.

In Step S103, the control unit 524 preferably acquires the correlation information regarding the pixel signal set by using a learned model.

In Step S104, the control unit 524 controls data that is output from the imaging element 511, on the basis of the correlation information acquired in Step S103 as the characteristic data. A specific example of the control is described below.

The control unit 524 compresses the amount of data regarding the plurality of pixel signals on the basis of the correlation information. For example, in a case where, as a result of comparison between two pixel signals, there is an unchanged region between the pixel signals, the control unit 524 compresses data regarding the unchanged region. As compression processing, a processing method known in the art may be employed.

The control unit 524 controls the imaging element 511 to output imaging data obtained by the compression to the outside (for example, an information processing apparatus or server connected to the image acquisition apparatus 500 with a cable or wirelessly). In this case, the plurality of pixel signals themselves acquired in Step S102 may not be output. With this, the amount of data that is output from the imaging element 511 to outside the imaging element 511 is reduced, so that the speed-limiting effect of the output interface or the effect of communication speed is reduced.

As described above, in Step S104, the control unit 524 controls, on the basis of the correlation data associated with the plurality of pixel signals, the data that is output from the imaging element 511. After the data has been output in Step S104, the control unit 524 advances the processing to Step S105.

In Step S105, the control unit determines whether to end the image acquisition processing. For example, the control unit 524 may determine whether there is a divided region to be imaged among the divided regions obtained by dividing the region R as the imaging target.

In a case where there is a divided region to be imaged, the control unit returns the processing to Step S102 and executes Step S102 to Step S104 on the divided region to be imaged. Step S102 to Step S104 are repeated to acquire image signals for the entire region R.

In a case where there is no divided region to be imaged (for example, in a case where all the divided regions of the region R have been subjected to the image acquisition processing), the control unit advances the processing to Step S106.

In Step S106, the control unit ends the image acquisition processing.

Through the above-mentioned image acquisition processing, higher-speed imaging data processing is achieved. For example, the amount of data regarding images that are acquired by Z-stacking can be reduced. In addition, since the control unit inside the imaging element achieves the reduction, the speed-limiting effect of the interface of the imaging element or communication speed on data transmission can be reduced.

(2-6-3) Example of Signal Acquisition Processing Flow (Focus Adjustment)

Another example of image acquisition processing for the subject S performed by the image acquisition apparatus 500 is described below with reference to FIG. 5.

Step S101 and Step S102 of FIG. 5 may be performed similarly to Step S101 and Step S102 in "(2-6-2) Example of signal acquisition processing flow (compressed image acquisition)" above.

In the characteristic data acquisition step of Step S103, the control unit 524 acquires a plurality of pieces of focus state information (particularly, focus accuracy information) as characteristic data, on the basis of the signal set (more specifically, pixel signal set) acquired in Step S102. The plurality of pieces of focus state information may be focus detection values, for example.

In Step S103, the control unit 524 preferably acquires the focus accuracy information by using a learned model.

In Step S104, the control unit 524 controls data that is output from the imaging element 511, on the basis of the plurality of pieces of focus state information acquired in Step S103 as the characteristic data. For example, on the basis of the plurality of pieces of focus state information, the control unit 524 generates an output image and controls the imaging element 511 to output the output image. The control unit 524 may generate the output image by using a learned model, for example.

For example, the output image is an image generated from a signal acquired at a certain Z position in the signal set. The output image is preferably an image generated from the most focused pixel signal.

Further, the output image may be an image generated from signals acquired at a plurality of Z positions (for example, a plurality of positions in the optical axis direction of the objective lens) in the signal set.

According to one embodiment of the present technology, the control unit 524 may select signals satisfying predetermined criteria from the signal set, on the basis of the focus state information (particularly, the focus accuracy information). For example, in a case where a focus detection value is employed as focus accuracy information, the control unit may select one or more in-focus signals, particularly, the most focused signal, on the basis of the focus detection value. The selection may be made by using a learned model, for example. The control unit 524 may generate an output image from the selected signal.

According to another embodiment of the present technology, the control unit 524 selects two or more signals from the pixel signal set on the basis of the focus accuracy information. The selection may be made by using a learned model, for example. The control unit 524 may generate one output image from the selected two or more signals.

For example, the control unit 524 may combine signals in partial regions having the highest focus accuracy among the selected two or more signals, thereby generating the image of the entire region as an output image.

In this way, in the present technology, the control unit 524 may divide each of images based on signals acquired at the plurality of positions into a plurality of regions, acquire focus state information regarding each of the plurality of regions, and connect the images of regions in focus to generate an output image. For example, the control unit 524 may divide each of the plurality of images acquired in Step S102 into a plurality of regions, acquire focus state information regarding each of the plurality of regions, and connect the images of regions in focus to generate an output image.

The control unit 524 controls the imaging element 211 to output the generated output image to the outside (for example, an information processing apparatus or server connected to the image acquisition apparatus 500 with a cable or wirelessly). In this case, the plurality of pixel signals themselves acquired in Step S102 may not be output. With this, the amount of data that is output from the imaging element 511 to outside the imaging element 511 is reduced, so that the speed-limiting effect of the output interface or the effect of communication speed is reduced.

As described above, in Step S104, the control unit 524 controls, on the basis of the focus accuracy information, the data that is output from the imaging element 511. After the data has been output in Step S104, the control unit 524 advances the processing to Step S105.

In Step S105, the control unit 524 determines whether to end the image acquisition processing. For example, the control unit 524 may determine whether there is a divided region to be imaged among the divided regions obtained by dividing the region R as the imaging target.

In a case where there is a divided region to be imaged, the control unit returns the processing to Step S102 and executes Step S102 to Step S104 on the divided region to be imaged. Step S102 to Step S104 are repeated to acquire pixel signals for the entire region R.

In a case where there is no divided region to be imaged (for example, in a case where all the divided regions of the region R have been subjected to the image acquisition processing), the control unit advances the processing to Step S106.

In Step S106, the control unit 524 ends the image acquisition processing.

Through the above-mentioned image acquisition processing, higher-speed auto focus processing is achieved. For example, pixel signals do not need to be transmitted to outside the imaging element in auto focus processing. Further, since pixel signals obtained after focus adjustment are output from the imaging element, the amount of data regarding the pixel signals that are output can be reduced.

(2-6-4) Example of Signal Acquisition Processing Flow (Analysis)

Another example of image acquisition processing for the subject S performed by the image acquisition apparatus 500 is described below with reference to FIG. 5.

Step S101 and Step S102 of FIG. 5 may be performed similarly to Step S101 and Step S102 in "(2-6-2) Example of image acquisition processing flow (compressed image acquisition)" above.

In the characteristic data acquisition step of Step S103, the control unit 524 may acquire characteristic data regarding the subject S as characteristic data, on the basis of the pixel signal set acquired in Step S102. The characteristic data regarding the subject S may include characteristics regarding the attributes of the subject S, for example. The characteristics regarding the attributes of the subject S may include the characteristics of, for example, the type of a living thing from which the subject S is derived, the type of the subject S, the types of the cells included in the subject S, or a disease that the subject S may have.

The type of a living thing from which the subject S is derived may be, for example, the taxonomic type (for example, human being), sex type (for example, male or female), or the type of aging (for example, age, age in months, or age in days) of the living thing.

The type of the subject S may be, for example, the type of an organ from which the living tissue is derived (for example, stomach), the type of each component of the organ (for example, stomach mucosal layer or muscle layer), or the type of body fluid (for example, blood).

The types of the cells included in the subject S may be types based on the classifications from one or more viewpoints of, for example, a form, a function, and a cell component, or types based on signs attached to the cells (for example, light-emitting bodies or antibodies).

The characteristics associated with a disease that the subject S may have may be, for example, whether the living tissue has the disease, a possibility that the living tissue has the disease, or the type of the disease (for example, the name of the disease or the progress of the disease).

In Step S103, the control unit 524 preferably acquires the characteristic data information regarding the subject S by using a learned model.

In Step S104, the control unit 524 controls data that is output from the imaging element 511, on the basis of the characteristic data associated with the subject S and acquired in Step S103 as the characteristic data.

For example, the control unit 524 may control the imaging element 511 to only output the characteristic data associated with the subject S. That is, for example, the imaging element 511 outputs disease information or the like regarding the subject S but does not output the acquired pixel signals.

Alternatively, the control unit 524 may output the characteristic data and image data associated with the subject S. The image data is preferably based on some pixel signals in the pixel signal set in Step S102. With this, the amount of image data that is output can be reduced, and the result of the analysis of the subject S can be output.

As described above, in Step S104, the control unit 524 controls the output from the imaging element 511, on the basis of the characteristic data associated with the subject S. After the output in Step S104, the control unit 524 advances the processing to Step S105.

In Step S105, the control unit 524 determines whether to end the image acquisition processing. For example, the control unit 524 may determine whether there is a divided region to be imaged among the divided regions obtained by dividing the region R as the imaging target.

In a case where there is a divided region to be imaged, the control unit returns the processing to Step S102 and executes Step S102 to Step S104 on the divided region to be imaged. Step S102 to Step S104 are repeated to acquire pixel signals for the entire region R.

In a case where there is no divided region to be imaged (for example, in a case where all the divided regions of the region R have been subjected to the image acquisition processing), the control unit advances the processing to Step S106.

In Step S106, the control unit 524 ends the image acquisition processing.

Through the above-mentioned image acquisition processing, the subject S can be analyzed at high speed. For example, pixel signals do not need to be transmitted to outside the imaging element for analyzing the subject S. Further, since the amount of data regarding pixel signals that are output from the imaging element is reduced, the speed-limiting effect described above can be reduced.

(2-7) Third Example of Signal Acquisition Processing (Image Acquisition Processing Using Spectrum Effective Region Information)

As described in "(1) Description of first embodiment" above, as the amount of image data that is used for a pathological diagnosis or the like increases, it takes a longer time to transmit the data, and the speed-limiting effect of transmission interfaces becomes greater.

As imaging apparatus configured to acquire spectral data, what is called hyperspectral cameras and multispectral cameras have been known. These cameras image subjects by using the spectrum imaging technology. Data acquired by the spectrum imaging technology has spectrum information regarding each pixel, in addition to location information in a two-dimensional direction (for example, x direction and y direction) regarding each pixel. Thus, the amount of data acquired by these cameras is particularly large.

The signal acquisition apparatus according to the present technology includes the control unit configured to acquire characteristic data regarding signals and generate output data on the basis of the characteristic data. Thus, in a case where the present technology is applied to the spectrum imaging technology, the control unit allows the imaging element to output a smaller amount of data to the outside. With this, the speed-limiting effect of the output interface of the imaging element or the effect of communication speed can be reduced. Thus, the signal acquisition apparatus according to the present technology is suitable for image acquisition by the spectrum imaging technology.

An example of signal acquisition processing by the signal acquisition apparatus according to the present technology that is configured to perform spectrum imaging is described below with reference to FIG. 11 and FIG. 12. FIG. 11 is a block diagram illustrating an example of the signal acquisition apparatus according to the present technology, which is configured as an image acquisition apparatus. FIG. 12 is a flow chart illustrating an example of processing that is performed by the image acquisition apparatus according to the present technology.

(2-7-1) Configuration Example of Signal Acquisition Apparatus

An image acquisition apparatus 600 illustrated in FIG. 9 includes a detector (that is, an imaging element) 611, an observation optical system 612, a stage 614, a stage control unit 615, a spectral imaging optical system 616 and optionally a processing apparatus 630, which may be external to the detector 611, or included as part of it. The processing apparatus 630 may be used with the control unit 624 to develop a learned model, as discussed herein. In an embodiment, the processing apparatus 630 helps to develop the learned model, and the control unit 624 applies the learned model when acquiring the characteristic data and generating the output data based on the characteristic data. The image acquisition apparatus 600 further includes an irradiation unit (not illustrated) configured to irradiate a living tissue (hereinafter also referred to as the "subject S") placed on the stage 614 with light.

The image acquisition apparatus 600 may be configured as a microscope apparatus, for example.

The descriptions in (2-1) to (2-3) above are applied to the imaging element 611, the irradiation unit, and the observation optical system 612. The descriptions of the stage 414 and the stage control unit 415 in "(2-5-1) Configuration example of signal acquisition apparatus" above are applied to the stage 614 and the stage control unit 615.

The spectral imaging optical system 616 is an optical system configured to disperse light from the subject S. The spectral imaging optical system 616 may be configured to disperse the light by a push-broom method (also called a "line scanning method") or may be configured to disperse the light by a snapshot method, for example.

In a case where the spectral imaging optical system 616 is a push-broom optical system, the optical system may include, for example, a diffraction element and/or a prism spectrometer as an optical component configured to disperse light from the subject S. The diffraction element may disperse the light by using the diffraction and/or interference of the light, for example. The prism spectrometer may disperse the light by using the refraction of the light, for example.

In a case where the spectral imaging optical system 616 is a snapshot optical system, the optical system may include, for example, a spectral filter provided on the pixel surface of the imaging element. The optical system may be configured to disperse light into different wavelengths in unit of pixels, for example.

The imaging element 611 includes a control unit 624. The control unit 624 acquires characteristic data regarding signals obtained by the imaging element 611 (particularly, an acquisition unit included in the imaging element). The characteristic data may be spectrum effective region information.

The wavelength range of light that can be dispersed by the spectral imaging optical system 616 is larger than the wavelength range of light produced by the subject S in many cases. That is, the entire photosensitive region of the imaging element 611 is not exposed to light, in other words, part of the photosensitive region is exposed to light while the remaining region is not exposed to the light, in many cases. Thus, as described below, acquisition of the spectrum effective region information makes it possible to read out pixel signals produced by light exposure only from a necessary region but not from the remaining region, so that the amount of signals that are transmitted can be reduced.

The spectrum effective region information may be, for example, data associated with the wavelength range of light dispersed by the spectral imaging optical system 616 or data associated with the wavelength range of light that is included in the light dispersed by the spectral imaging optical system 616 and has an intensity equal to or stronger than a predetermined threshold. With such data, in the imaging element 611, a region from which signals are read out can be limited.

Alternatively, the spectrum effective region information may be data associated with regions of the pixels of the imaging element 611 from which signals are read out. The regions from which signals are read out may be set on the basis of the wavelength range of the dispersed light.

The control unit 624 preferably acquires the spectrum effective region information by using a learned model. The learned model may be a learned model generated by deep learning, for example. The learned model may include, for example, an input layer configured to receive pixel signals obtained by imaging living tissues, an output layer configured to output spectrum effective region information regarding the pixel signals, and at least one intermediate layer provided between the input layer and the output layer.

The learned model may be, for example, a learned model obtained by machine learning using one or a plurality of pieces of training data including combinations of pixel signals obtained by imaging a living tissue and spectrum effective region information regarding the pixel signals.

Further, the control unit 624 may drive the stage control unit 615 of the image acquisition apparatus 600 to move the stage 614.

The control unit 624 can drive, for example, the stage control unit 615 to move the stage 614 in the direction perpendicular to the optical axis of the observation optical system, thereby changing imaging regions. For example, with the movement, scanning for performing dispersion by the push-broom method described above may be performed.

The control unit 624 can drive, for example, the stage control unit 615 to move the stage 614 in the optical axis direction of the observation optical system (particularly, the focus direction of the objective lens), thereby bringing the subject S into focus. Note that the control unit 624 may control the observation optical system of the image acquisition apparatus 600 to bring the subject S into focus.

(2-7-2) Configuration Example of Optical System of Image Acquisition Apparatus A configuration example of an optical system in a case where the image acquisition apparatus 600 performs imaging by the line scanning method is described below with reference to FIG. 10 and FIG. 11.

The image acquisition apparatus 600 illustrated in FIG. 10 includes the imaging element 611, the observation optical system 612, an irradiation unit 613, the stage 614, and the spectral imaging optical system 616.

The irradiation unit 613 irradiates the subject S with multiple line illumination beams that are arranged on different axes in parallel and have different wavelengths. The spectral imaging optical system 616 disperses light produced from the living tissue irradiated by the irradiation unit 613. The imaging element 611 receives the dispersed light.

Here, being arranged on different axes in parallel means that the multiple line illumination beams are on different axes and in parallel. Being on different axes means not being on the same axis, and distances between the axes are not particularly limited. Being in parallel means not only being completely in parallel but also being substantially in parallel. For example, being deviated from a parallel state due to the distortion or manufacturing tolerances of optical systems such as lenses is allowable and is regarded as being parallel.

The stage 614 is connected to the irradiation unit 613 and the spectral imaging optical system 616 through a second observation optical system 122 including an objective lens 44 and the like. The irradiation unit 613 has a function of following an optimum focal point with a focusing mechanism 60. The irradiation unit 613 may be connected to a non-fluorescence observation unit 70 configured to perform dark field observation, bright field observation, or the like.

The irradiation unit 613 includes a plurality of light sources L1, L2, . . . , and Ln (n is, for example, 1 to 10, particularly, 1 to 8) capable of outputting light having a plurality of excitation wavelengths Ex1, Ex2, . . . , and Exn (n is, for example, 1 to 10, particularly, 1 to 8). The plurality of light sources typically includes light-emitting diodes (LEDs), laser diodes (LDs), mercury lamps, or the like. Light from each light source is formed into line illumination to be emitted to the subject S held on the stage 614.

As illustrated in FIG. 12, the subject S typically includes a slide including a living tissue Sa such as a histological section. However, needless to say, the subject S may not be the slide. The subject S may be dyed with a plurality of fluorescent dyes. The image acquisition apparatus 600 magnifies the subject S at a desired magnification for observation. When the part of A of FIG. 6 is magnified, as illustrated in FIG. 13, the irradiation unit 613 has the plurality of line illumination beams (two in FIG. 13 (Ex1 and Ex2)), and photographing areas R1 and R2 of the imaging element 611 are arranged so as to overlap the illuminating areas of the respective line illumination beams. The two line illumination beams Ex1 and Ex2 are parallel to each other in the X-axis direction and apart from each other in the Y-axis direction by a predetermined distance ($\Delta y$).

The photographing areas R1 and R2 correspond to the respective slit portions of an observation slit 51 (FIG. 11) in the spectral imaging optical system 616. That is, there are as many slit portions provided in the spectral imaging optical system 616 as the line illumination beams. In FIG. 7, the illumination line width is larger than the slit width, but it does not matter which one is larger. In the case where the illumination line width is larger than the slit width, a large alignment margin can be secured for the irradiation unit 613 with respect to the spectral imaging optical system 616.

The wavelength forming the first line illumination beam Ex1 and the wavelength forming the second line illumination beam Ex2 are different from each other. Linear fluorescence excited by the line illumination beams Ex1 and Ex2 reaches the spectral imaging optical system 616 through the observation optical system 612 and is then received by the imaging element 611.

The spectral imaging optical system 616 has an observation slit 31 having a plurality of slit portions through which fluorescence excited by the plurality of line illumination beams can pass. The imaging element 611 individually receives fluorescence that has passed through the observation slit 31. As the imaging element 611, a two-dimensional imager such as a CCD (Charge Coupled Device) or a CMOS (Complementary Metal Oxide Semiconductor) is employed. The observation slit 51 is disposed on the optical path, so that fluorescence spectra excited by the respective lines can be detected without overlapping.

The imaging element 611 acquires, from each of the line illumination beams Ex1 and Ex2, fluorescence spectral data (x, $\lambda$) using a pixel array in one direction of the imaging element 611 (for example, vertical direction) as a wavelength channel. The obtained spectral data (x, $\lambda$) is recorded on, for example, the control unit in association with an excitation wavelength used when obtaining the spectral data in question.

The image acquisition apparatus 600 includes, as illustrated in FIG. 11, a dichroic mirror 42 and a band-pass filter 45 inserted in the middle of the optical path such that the excitation light (Ex1 and Ex2) does not reach the imaging element 611. In this case, fluorescence spectra formed on the imaging element 611 have intermittent portions (see FIG. 14 and FIG. 15). The intermittent portions are omitted from the readout region, so that the frame rate can be enhanced.

The imaging element 611 may include, as illustrated in FIG. 11, a plurality of imaging elements 611a and 611b each capable of receiving fluorescence that has passed through the observation slit 51. In this case, fluorescence spectra Fs1 and Fs2 respectively excited by the line illumination beams Ex1 and Ex2 are acquired by the imaging elements 611a and 611b, as illustrated in FIG. 16, to be stored in a storage unit (not illustrated) in association with the excitation light.

Each of the line illumination beams Ex1 and Ex2 does not necessarily have a single wavelength and may have a plurality of wavelengths. In a case where the line illumination beams Ex1 and Ex2 each have a plurality of wavelengths, fluorescence excited by the line illumination beam Ex1 and fluorescence excited by the line illumination beam Ex2 each also have a plurality of spectra. In this case, the spectral imaging optical system 616 includes a wavelength dispersion element for separating the fluorescence into spectra based on the excitation wavelengths. The wavelength dispersion element includes, for example, a diffraction grating or a prism and is typically disposed between the observation slit 51 and the imaging element 611 on the optical path.

The image acquisition apparatus 600 further includes a scan mechanism (not illustrated) configured to emit, to the stage 614, the plurality of line illumination beams Ex1 and Ex2 in the Y-axis direction, that is, the direction in which the line illumination beams Ex1 and Ex2 are arranged. Using the scan mechanism makes it possible to sequentially record, in the Y-axis direction, dye spectra (fluorescence spectra) spatially apart from each other by $\Delta y$ on the sample S (observation subject Sa) and excited by different excitation wavelengths. In this case, for example, a photographing region Rs is divided into a plurality of regions in the X-axis direction as illustrated in FIG. 17, and operation in which the sample S is scanned in the Y-axis direction, is then moved in the X-axis direction, and is scanned in the Y-axis direction again is repeated. By one-time scan, a sample-derived spectroscopy spectrum image excited by several kinds of excitation wavelengths can be photographed.

With the scan mechanism, the stage 614 is typically scanned in the Y-axis direction and may be scanned with the plurality of line illumination beams Ex1 and Ex2 in the Y-axis direction by a galvanometer mirror disposed in the middle of the optical system. Eventually, three-dimensional data (X, Y, $\lambda$) as illustrated in FIG. 18 is acquired for each of the plurality of line illumination beams Ex1 and Ex2. Since the three-dimensional data derived from each of the line illumination beams Ex1 and Ex2 is data with coordinates shifted by $\Delta y$ in the Y axis, the three-dimensional data is output after being corrected on the basis $\Delta y$ recorded in advance or the value of $\Delta y$ calculated from output from the imaging element 611.

In the example described so far, the excitation light includes two line illumination beams, but the excitation light is not limited thereto and may include three, four, five, or more line illumination beams. Further, each line illumination beam may have a plurality of excitation wavelengths selected as wavelengths that deteriorate the color separation performance as little as possible. Further, even with a single line illumination beam, when an excitation light source has a plurality of excitation wavelengths and each excitation wavelength and Row data acquired by an imaging element are record in association with each other, polychromatic spectra can be obtained although the resolution is lower than that in the case of using line illumination beams arranged on different axes in parallel. For example, a configuration as illustrated in FIG. 19 may be employed.

Next, with reference to FIG. 11, the details of the optical system of the image acquisition apparatus 600 are described. Here, an example in which the image acquisition apparatus 600 is configured as the configuration example 2 of FIG. 19 is described.

The irradiation unit 613 includes a plurality of (four in the present example) excitation light sources L1, L2, L3, and L4. The excitation light source L1 includes a laser light source configured to output laser light with a wavelength of 405 nm, the excitation light source L2 includes a laser light source configured to output laser light with a wavelength of 488 nm, the excitation light source L3 includes a laser light source configured to output laser light with a wavelength of 561 nm, and the excitation light source L4 includes a laser light source configured to output laser light with a wavelength of 645 nm.

The irradiation unit 613 further includes multiple collimator lenses 11 and laser line filters 12 that correspond to the respective excitation light sources L1 to L4, dichroic mirrors 13A, 13B, and 13c, a homogenizer 14, a condenser lens 15, and an entrance slit 16.

Laser light output from the excitation light source L1 and laser light output from the excitation light source L3 are each collimated by the collimator lens 11 into parallel light. Then, the laser light passes through the laser line filter 12 for cutting the base of the wavelength band and is made coaxial by the dichroic mirror 13A. The laser light from the excitation light source L1 and the laser light from the excitation light source L3 that are made coaxial to each other are formed into the line illumination beam Ex1 by the homogenizer 14 such as a fly-eye lens and the condenser lens 15.

Laser light output from the excitation light source L2 and laser light output from the excitation light source L4 are similarly made coaxial to each other by the dichroic mirrors 13B and 13c and formed into the line illumination beam Ex2 on an axis different from that of the line illumination beam Ex1. The line illumination beams Ex1 and Ex2 form line illumination beams on different axes apart from each other by Δy (primary image) on the entrance slit 16 having multiple slit portions (slit conjugate) through which the respective line illumination beams Ex1 and Ex2 can pass.

The subject S on the stage 614 is irradiated with this primary image through the observation optical system 612. The observation optical system 612 includes a condenser lens 41, dichroic mirrors 42 and 43, the objective lens 44, the band-pass filter 45, and a condenser lens 46. The line illumination beams Ex1 and Ex2 are formed into parallel light by the condenser lens 41 paired with the objective lens 44. The line illumination beams Ex1 and Ex2 are reflected by the dichroic mirrors 42 and 43 to pass through the objective lens 44, and emitted to the subject S.

On the surface of the subject S, illumination as in FIG. 13 is formed. Fluorescence excited by these illumination beams is collected by the objective lens 44. The fluorescence is reflected by the dichroic mirror 43 to pass through the dichroic mirror 42 and the band-pass filter 45 configured to cut the excitation light, and is collected again by the condenser lens 46 to enter the spectral imaging optical system 616.

The spectral imaging optical system 616 includes the observation slit 31, a first prism 33, a mirror 34, a diffraction grating 35 (wavelength dispersion element), and a second prism 36.

The observation slit 31 is disposed at the focal point of the condenser lens 46 and has as many slit portions as the excitation lines. A fluorescence spectrum derived from the two excitation lines passes through the observation slit 51 to be separated by the first prism 53. The fluorescence spectra are then reflected by the lattice plane of the diffraction grating 55 through the mirror 54 to be further separated into fluorescence spectra based on the respective excitation wavelengths. The four separated fluorescence spectra thus obtained enter the imaging elements 611a and 611b through the mirror 54 and the second prism 56 to be expanded to (x, λ) information as spectral data.

The pixel size (nm/Pixel) of the imaging elements 611a and 611b is set to, for example, 2 nm or more but 20 nm or less but is not limited thereto. This variance value may be achieved by the pitch of the diffraction grating 55 or optically, or achieved by using the hardware binning of the imaging elements 611a and 611b.

The stage 614 and the scan mechanism form an X-Y stage and move the subject S in the X-axis direction and the Y-axis direction to acquire the fluorescence images of the subject S. In WSI (Whole slide imaging), operation in which the subject S is scanned in the Y-axis direction, is then moved in the X-axis direction, and is scanned in the Y-axis direction again is repeated (see FIG. 17).

The non-fluorescence observation unit 70 includes a light source 71, the dichroic mirror 43, the objective lens 44, a condenser lens 72, an imaging element 73, and the like. With regard to the non-fluorescence observation system, a dark field illumination observation system is illustrated in FIG. 11.

The light source 71 is disposed below the stage 614 and irradiates the subject S on the stage 614 with illumination light emitted from the opposite side of the line illumination beams Ex1 and Ex2. In the case of dark field illumination, the light source 71 emits illumination light from outside the NA (numerical aperture) of the objective lens 44 and photographs, by the imaging element 73, light diffracted by the subject S (dark field image) through the objective lens 44, the dichroic mirror 43, and the condenser lens 72. With the use of dark field illumination, samples that seem to be transparent, such as fluorescent dye samples, can be observed with contrast.

Note that this dark field image and fluorescence may be simultaneously observed to be used for real-time focus. In this case, it is sufficient to select, as the illumination wavelength, a wavelength that does not affect fluorescence observation. The non-fluorescence observation unit 70 is not limited to an observation system configured to acquire dark field images and may be configured as an observation system capable of acquiring non-fluorescence images such as bright field images, phase difference images, phase images, or in-line hologram images. Examples of the non-fluorescence image acquisition method can include various observation methods such as the schlieren method, the phase difference contrast method, the polarization observation method, and the epi-illumination method. The illumination light source is not necessarily provided below the stage and may be provided above the stage or around the objective lens. Further, not only the method with real-time focus control but also another method such as a pre-focus map method in which a focus coordinate (Z coordinate) is recorded in advance may be employed.

Note that the image acquisition apparatus 600 may employ a configuration other than the configuration having the line illumination beams arranged on different axes and in parallel as described above. The image acquisition apparatus 600 may include, for example, an irradiation unit having a line illumination beam on a single axis and a spectral imaging optical system configured to disperse light produced from a living tissue irradiated by the irradiation unit. In a case where the image acquisition apparatus 600 is configured in this way, the irradiation unit may emit light having one excitation wavelength. Further, the spectral imaging optical system may be configured to acquire fluorescence spectra produced through light irradiation by the irradiation unit and may include one imaging element (spectrum camera), for example.

(2-7-3) Example of Signal Acquisition Processing Flow

An example of signal acquisition processing (image acquisition processing) for the subject S performed by the image acquisition apparatus 600 is described below with reference to FIG. 12.

In Step S101 of FIG. 5, the image acquisition processing using the image acquisition apparatus according to the present technology starts. Prior to the start of the processing, the bio-derived subject S is placed on the stage 614. The stage 614 is disposed at a position that allows the image acquisition apparatus 600 to image the subject S.

In the imaging step of Step S102, the image acquisition apparatus 600 images the subject S. The imaging is performed as follows, for example.

In Step S102, the irradiation unit 613 irradiates the subject S on the stage 614 with light. A light source included in the irradiation unit 613 may appropriately be selected by persons skilled in the art depending on the types of image signals to be acquired by the imaging element 611. The light source may include, for example, at least one of a halogen lamp, an LED lamp, a mercury lamp, or a xenon lamp. For example, in a case where the image data is bright field image data, the irradiation unit 613 may include, for example, an LED lamp or a halogen lamp. In a case where the image data is fluorescent image data, the irradiation unit 613 may include, for example, a laser light source, an LED lamp, a mercury lamp, or a xenon lamp. In Step S102, a processing unit (not illustrated) or a user may control the irradiation unit 613 to emit the light.

In Step S102, the imaging element 611 images, in the state where the subject S is being irradiated with the light, the subject S through the observation optical system 612, thereby acquiring pixel signals. The imaging may be performed by the line scanning method, for example. With this, dispersion by the push-broom method described above is achieved. In the line scanning method, the region including the subject S is divided into a plurality of belt-like regions, and the divided regions are sequentially scanned.

In Step S102, the control unit controls the imaging element 611 to perform the imaging.

In the characteristic data acquisition step of Step S103, the imaging element 611 (particularly, the control unit 624 included in the imaging element 611) acquires spectrum effective region information as characteristic data regarding the pixel signals, on the basis of the pixel signals acquired in Step S102.

In Step S103, the control unit 624 preferably acquires the spectrum effective region information on the basis of the image signals, by using a learned model. The learned model may be generated, as training data, by using one or a plurality of combinations of image data regarding a subject including a living tissue and spectrum effective region information regarding the subject, for example.

In Step S104, the control unit 624 generates output data on the basis of the spectrum effective region information acquired in Step S103 as the characteristic data. The output data is output from the imaging element 611.

For example, the control unit 624 controls the readout region of the imaging element on the basis of the spectrum effective region information. More specifically, the control unit 624 selects, on the basis of the spectrum effective region information, the wavelength range of pixels to be read out from the pixels of the imaging element 611.

For example, as illustrated in FIG. 20, from a photosensitive region covering a predetermined wavelength range, a photosensitive region partly covering the predetermined wavelength range is selected as a readout region. The partly-covering photosensitive region is selected on the basis of the spectrum effective region information. The selection is preferably made with the use of learned data.

With this, signals for the part of the photosensitive region are read out while signals for the remaining region are not read out. Thus, the amount of signals that are transmitted is reduced, and the line rate can therefore be enhanced.

The control unit controls the imaging element 611 to output only signals read out from the photosensitive region to the outside (for example, an information processing apparatus or server connected to the image acquisition apparatus 600 with a cable or wirelessly). The amount of data that is output from the imaging element 611 to outside the imaging element 611 is reduced, so that the speed-limiting effect of the output interface or the effect of communication speed is reduced.

As described above, in Step S104, the control unit controls, on the basis of the spectrum effective region information, the data that is output from the imaging element 611. After the output in Step S104, the control unit advances the processing to Step S105.

In Step S105, the control unit determines whether to end the image acquisition processing. For example, the control unit may determine whether there is a divided region to be imaged among the belt-like divided regions obtained by dividing the region as the imaging target.

In a case where there is a divided region to be imaged, the control unit returns the processing to Step S102 and executes Step S102 to Step S104 on the divided region to be imaged. Step S102 to Step S104 are repeated to acquire image signals for the entire region.

In a case where there is no divided region to be imaged (for example, in a case where all the divided regions of the region have been subjected to the image acquisition processing), the control unit advances the processing to Step S106.

In Step S106, the control unit ends the image acquisition processing.

2. Second Embodiment (Signal Acquisition System)

The present technology also provides a signal acquisition system including the signal acquisition apparatus described in "1." above and an analysis unit configured to analyze output data (for example, image data) output from the signal acquisition apparatus.

In the embodiment, the analysis unit may be provided inside or outside the signal acquisition apparatus. For example, the analysis unit may be configured as an information processing apparatus connected to the signal acquisition apparatus with a cable or wirelessly.

The signal acquisition system may be a medical image acquisition system, for example. Further, the image acquisition system may be an endoscope system or a microscope system.

A configuration example of the information processing apparatus is described below with reference to FIG. 21. Note that the configuration of the information processing apparatus is not limited to the following one.

An information processing apparatus 1000 illustrated in FIG. 21 includes a CPU (Central Processing Unit) 1001, a RAM 1002, and a ROM 1003. The CPU 1001, the RAM 1002, and the ROM 1003 are connected to each other through a bus 1004. An input/output interface 1005 is further connected to the bus 1004.

To the input/output interface 1005, a communication apparatus 1006, a storage unit 1007, a drive 1008, an output unit 1009, and an input unit 1010 are connected.

The communication apparatus 1006 connects the information processing apparatus 1000 to a network 1011 with a cable or wirelessly. With the communication apparatus 1006, the information processing apparatus 1000 can acquire various types of data (for example, image data) via the network 1011. The acquired data may be stored in a disk 1007, for example. The type of the communication apparatus 1006 may appropriately be selected by persons skilled in the art.

The storage unit 1007 may store an operating system (for example, WINDOWS (registered trademark), UNIX (registered trademark), LINUX (registered trademark), ANDROID (registered trademark), or iOS (registered trademark)), a program for causing the microscope apparatus to execute an image acquisition method according to the present technology, other various programs, and various types of data (for example, image data and characteristic data).

The drive 1008 can read out data (for example, image data and characteristic data) or programs recorded on a recording medium and output the data or the programs to the RAM 1002. The recording medium is, for example, a micro SD memory card, an SD memory card, or a flash memory but is not limited thereto.

The output unit 1009 controls an image display unit to output image display light on the basis of image data. The input unit 1010 receives operation on the microscope apparatus made by a user, for example.

3. Third Embodiment (Signal Acquisition Method)

A signal acquisition method according to the present technology includes a signal acquisition step of acquiring signals from light from a living tissue irradiated with light, a characteristic data acquisition step of acquiring characteristic data regarding the signals obtained in the signal acquisition step, and an output data generation step of generating output data on the basis of the characteristic data.

The signal acquisition step, the characteristic data acquisition step, and the output control step correspond to the signal acquisition step of Step S102, the characteristic data acquisition step of Step S103, and the output data generation step of Step S104 in FIG. 5 described in "1." above, and the descriptions above are also applied to the present embodiment.

The signal acquisition method may be performed with the use of the signal acquisition apparatus 100 described in "1." above, for example, or may be performed by another apparatus.

Note that the present technology can also include the following configurations.

(1)
A signal acquisition apparatus including:
an irradiation unit configured to irradiate a living tissue with light; and
a detector configured to acquire, after light irradiation by the irradiation unit, signals from light from the living tissue and generate output data based on the signals,
in which the detector includes
an acquisition unit configured to acquire the signals, and
a control unit configured to acquire characteristic data regarding the signals and
generate the output data based on the characteristic data, and
the acquisition unit and the control unit of the detector are disposed in a single semiconductor chip.

(2)
The signal acquisition apparatus according to (1),
in which the detector includes an imaging element.

(3)
The signal acquisition apparatus according to (1) or (2),
in which the signals each include a pixel signal.

(4)
The signal acquisition apparatus according to any one of (1) to (3),
in which the control unit acquires the characteristic data regarding the signals by using a learned model.

(5)
The signal acquisition apparatus according to any one of (1) to (4),
in which the control unit controls the output data by using the learned model.

(6)
The signal acquisition apparatus according to any one of (1) to (5),
in which the detector includes the imaging element, and the control unit controls the output data, based on focus state information upon imaging performed by the imaging element.

(7)
The signal acquisition apparatus according to (6),
in which the focus state information includes focus state information regarding at least some of the signals.

(8)
The signal acquisition apparatus according to (6) or (7),
in which the focus state information includes a Z position upon the imaging, an amount of blur of the signals, or an amount of deviation of the Z position from an in-focus position.

(9)
The signal acquisition apparatus according to any one of (6) to (8),
in which the control unit acquires the focus state information by using the learned model.

(10)
The signal acquisition apparatus according to any one of (6) to (9),
in which the control unit determines whether to execute focus adjustment, based on the focus state information.

(11)

The signal acquisition apparatus according to (9) or (10),
in which the control unit executes the focus adjustment based on the focus state information, and then, the imaging element images the living tissue at a position where the focus adjustment is executed.

(12)

The signal acquisition apparatus according to (11),
in which the control unit generates the output data based on a signal obtained upon imaging at the position where the focus adjustment is executed.

(13)

The signal acquisition apparatus according to (1),
in which the detector includes an imaging element, and
the control unit determines, based on the characteristic data regarding the signals, whether to execute focus adjustment for imaging performed by the imaging element.

(14)

The signal acquisition apparatus according to (13),
in which the control unit drives, based on the characteristic data, the acquisition unit to image the living tissue at a position where the focus adjustment is executed.

(15)

The signal acquisition apparatus according to (14),
in which the control unit generates the output data based on the signals and a signal obtained upon imaging at the position where the focus adjustment is executed.

(16)

The signal acquisition apparatus according to (1),
in which the detector includes an imaging element,
the acquisition unit acquires the signals from the light from the living tissue at a plurality of positions in an optical axis direction upon imaging performed by the imaging element, and
the control unit acquires, from a set of the signals acquired at the plurality of positions, signal correlation information or focus state information.

(17)

The signal acquisition apparatus according to (16),
in which the focus state information includes a focus detection value.

(18)

The signal acquisition apparatus according to (16) or (17),
in which the control unit generates an output image based on a plurality of pieces of the focus state information and controls the imaging element to output the output image.

(19)

The signal acquisition apparatus according to any one of (16) to (18),
in which the output image includes an image generated from a signal acquired at a certain Z position in the signal set.

(20)

The signal acquisition apparatus according to any one of (16) to (19),
in which the output image includes an image generated from a most focused signal in the signal set.

(21)

The signal acquisition apparatus according to any one of (16) to (20),
in which the output image includes an image generated from signals acquired at a plurality of Z positions in the signal set.

(22)

The signal acquisition apparatus according to any one of (16) to (21),
in which the control unit generates the output image by using a learned model.

(23)

The signal acquisition apparatus according to any one of (16) to (22),
in which the control unit divides each of images based on the signals acquired at the plurality of positions into a plurality of regions, acquires focus state information regarding each of the plurality of regions, and connects images of regions in focus to generate the output image.

(24)

The signal acquisition apparatus according to (1),
in which the control unit acquires spectrum effective region information based on the signals obtained by the acquisition unit.

(25)

The signal acquisition apparatus according to (24),
in which the control unit acquires the spectrum effective region information by using a learned model.

(26)

The signal acquisition apparatus according to (24) or (25),
in which the control unit controls a readout region of the detector based on the spectrum effective region information.

(27)

The signal acquisition apparatus according to any one of (1) to (26),
in which the acquisition unit acquires the signals from the light from the living tissue through an objective lens.

(28)

The signal acquisition apparatus according to any one of (1) to (27),
in which the living tissue includes a bio-derived tissue sample.

(29)

The signal acquisition apparatus according to any one of (1) to (28), further including:
an output unit configured to output the output data.

(30)

The signal acquisition apparatus according to any one of (1) to (29), further including:
an analysis unit configured to analyze the output data.

(31)

A signal acquisition system including:
a signal acquisition apparatus including
an irradiation unit configured to irradiate a living tissue with light, and
a detector configured to acquire a signal from light from the living tissue irradiated with the light by the irradiation unit and generate output data based on the signal, the detector including
an acquisition unit configured to acquire the signal, and
a control unit configured to acquire characteristic data regarding the signal and generate the output data based on the characteristic data,
the acquisition unit and the control unit of the detector being disposed in a single semiconductor chip; and
an analysis unit configured to analyze the output data output from the signal acquisition apparatus.

(32)

The signal acquisition system according to (31),
in which the signal acquisition system includes a medical image acquisition system.

(33)
The signal acquisition system according to (31) or (32), in which the signal acquisition system includes an endoscope system or a microscope system.

(34)
A signal acquisition method including:
a signal acquisition step of acquiring a signal from light from a living tissue irradiated with light;
a characteristic data acquisition step of acquiring characteristic data regarding the signal obtained in the signal acquisition step; and
an output data generation step of generating output data based on the characteristic data.

(35)
A signal acquisition apparatus comprising:
a light source configured to irradiate a biological sample with light; and
a single semiconductor chip that includes
a detector configured to detect light from the biological sample in a plurality of conditions, and
circuitry configured to apply a learned model to an output provided by the detector to determine characteristic data about at least one of the biological sample or at least one of the plurality of conditions.

(36)
The signal acquisition apparatus according to (35), wherein
the plurality of conditions includes detection of the light from the biological sample from at least one of a plurality of positions or a plurality of angles.

(37)
The signal acquisition apparatus according to (35), wherein
the plurality of conditions includes detection of the light from the biological sample at a plurality of different light wavelengths.

(38)
The signal acquisition apparatus according to (35), wherein
the plurality of conditions includes detection by the detector of the light from the biological sample at different times.

(39)
The signal acquisition apparatus according to (35), wherein
the semiconductor chip is configured to receive the learned model from an external processing apparatus.

(40)
The signal acquisition apparatus according to (35), wherein
the circuitry of the single semiconductor chip is configured to train the learned model.

(41)
The signal acquisition apparatus according to (35), wherein
the detector includes an imaging element, and the output provided by the detector includes a pixel signal from the imaging element.

(42)
The signal acquisition apparatus according to (35), wherein
the detector includes an imaging element, and
the circuitry is further configured to determine the characteristic data based on focus state information of the imaging element.

(43)
The signal acquisition apparatus according to (42), wherein
the focus state information includes at least one of a Z position at a time of imaging, an amount of blur of the light received by the imaging element, or an amount of deviation of the Z position from an in-focus position.

(44)
The signal acquisition apparatus according to (42), wherein
the circuitry is configured to determine whether to execute focus adjustment based on the focus state information.

(45)
The signal acquisition apparatus according to (44), wherein
the circuitry is configured to execute the focus adjustment of the imaging element prior to the imaging element capturing an image of the biological sample by the imaging element at a position after the focus adjustment has been executed.

(46)
The signal acquisition apparatus according to (44), wherein
the circuitry is configured to generate the characteristic data from a signal provided by the imaging device at the position after the focus adjustment has been executed.

(47)
The signal acquisition apparatus according to (35), wherein the detector includes an imaging element, and
the circuitry is configured to determine, based on the characteristic data, whether to execute focus adjustment on the imaging element.

(48)
The signal acquisition apparatus according to (47), wherein
the circuitry is configured to control, based on the characteristic data, an imaging operation performed by the imaging element of the biological sample at a position where the focus adjustment has already been executed.

(49)
The signal acquisition apparatus according to (35), wherein
the detector includes an imaging element,
the circuitry is configured to acquire signals from the imaging element from the light from the biological sample at a plurality of positions in an optical axis direction, and
the circuitry is further configured to acquire from a set of the signals acquired at the plurality of positions, signal correlation information or focus state information.

(50)
The signal acquisition apparatus according to (49), wherein
the focus state information includes a focus detection value.

(51)
The signal acquisition apparatus according to (49), wherein
the circuitry is configured to generate an output image based on a plurality of pieces of the focus state information and control the imaging element to output the output image.

(52)
The signal acquisition apparatus according to (51), wherein
the output image includes an image generated from a signal acquired at a certain Z position in the set of signals.

(53)
The signal acquisition apparatus according to (50), wherein
an output image from the imaging element includes an image generated from a most focused signal in the set of signals.

(54)
The signal acquisition apparatus according to (49), wherein
an output image from the imaging element includes an image generated from signals acquired at a plurality of Z positions in the set of signals.

(55)
The signal acquisition apparatus according to (49), wherein the circuitry is also configured to apply the learned model to image data from the imaging element to generate an output image of the biological sample.

(56)
The signal acquisition apparatus according to (49), wherein
the circuitry is configured to
divide respective images based on the set of signals acquired at the plurality of positions into a plurality of regions,
acquire focus state information regarding each of the plurality of regions, and connect images of regions in focus to generate an output image.

(57)
The signal acquisition apparatus according to (35), wherein
the circuitry is configured to acquire spectrum effective region information based on previously obtained output from the detector.

(58)
The signal acquisition apparatus according to (57), wherein
the circuitry is configured to acquire the spectrum effective region information by using the learned model.

(59)
The signal acquisition apparatus according to (57), wherein
the circuitry is configured to control a readout region of the detector based on the spectrum effective region information.

(60)
The signal acquisition apparatus according to (35), wherein
the circuitry is configured to acquire the output from the detector from the light from the biological sample through an objective lens.

(61)
The signal acquisition apparatus according to (35), wherein
the biological sample includes a bio-derived tissue sample.

(62)
A sensor comprising:
a detector configured to detect light from a biological sample in a plurality of conditions and generate output data based on the detected light, and
circuitry configured to apply a learned model to the output data provided by the detector to determine characteristic data about at least one of the biological sample or at least one of the plurality of conditions.

(63)
A signal acquisition system comprising:
a signal acquisition apparatus including
a light source configured to irradiate a biological sample with light, and
a single semiconductor chip that includes
a detector configured to produce a signal from light returned from the biological sample irradiated with the light by the light source, and
circuitry configured to
apply a learned model to the signal provided by the detector to determine characteristic data about at least one of the biological sample or a condition under which the detector produced the signal; and
analysis circuitry configured to analyze the characteristic data output from the signal acquisition apparatus.

(64)
The signal acquisition system according to (63),
wherein the signal acquisition system includes a medical image acquisition system.

(65)
The signal acquisition system according to (63), wherein
the signal acquisition system includes an endoscope system or a microscope system.

(66)
A signal acquisition method comprising:
irradiating a biological sample with light from a light source;
detecting, with a detector, light from the biological sample in a plurality of conditions; and
applying, with circuitry, a learned model to an output provided by the detector and determining characteristic data about at least one of the biological sample or at least one of the plurality of conditions, wherein
the detector and the circuitry being contained within a single semiconductor chip.

DESCRIPTION OF REFERENCE SYMBOLS

100 Signal acquisition apparatus
111 Detector
112 Observation optical system
113 Irradiation unit

The invention claimed is:
1. A signal acquisition apparatus comprising:
a light source configured to irradiate a biological sample with light; and
a single semiconductor chip that includes
a detector configured to detect light from the biological sample in a plurality of conditions, and
circuitry configured to apply a learned model to an output provided by the detector to determine characteristic data about the biological sample according to a condition, the condition being at least one of the plurality of conditions, the condition comprising detection of the light from the biological sample at a plurality of different light wavelengths.
2. The signal acquisition apparatus according to claim 1, wherein
the condition further comprising detection of the light from the biological sample from at least one of a plurality of positions or a plurality of angles.

3. The signal acquisition apparatus according to claim 1, wherein
the condition further comprising detection by the detector of the light from the biological sample at different times.

4. The signal acquisition apparatus according to claim 1, wherein
the semiconductor chip is configured to receive the learned model from an external processing apparatus.

5. The signal acquisition apparatus according to claim 1, wherein
the circuitry of the single semiconductor chip is configured to train the learned model.

6. The signal acquisition apparatus according to claim 1, wherein
the detector includes an imaging element, and the output provided by the detector includes a pixel signal from the imaging element.

7. The signal acquisition apparatus according to claim 1, wherein
the detector includes an imaging element, and
the circuitry is further configured to determine the characteristic data based on focus state information of the imaging element.

8. The signal acquisition apparatus according to claim 7, wherein
the focus state information includes at least one of a Z position at a time of imaging, an amount of blur of the light received by the imaging element, or an amount of deviation of the Z position from an in-focus position.

9. The signal acquisition apparatus according to claim 7, wherein
the circuitry is configured to determine whether to execute focus adjustment based on the focus state information.

10. The signal acquisition apparatus according to claim 9, wherein
the circuitry is configured to execute the focus adjustment of the imaging element prior to the imaging element capturing an image of the biological sample by the imaging element at a position after the focus adjustment has been executed.

11. The signal acquisition apparatus according to claim 10, wherein
the circuitry is configured to generate the characteristic data from a signal provided by the imaging device at the position after the focus adjustment has been executed.

12. The signal acquisition apparatus according to claim 1, wherein
the detector includes an imaging element, and
the circuitry is configured to determine, based on the characteristic data, whether to execute focus adjustment on the imaging element.

13. The signal acquisition apparatus according to claim 12, wherein
the circuitry is configured to control, based on the characteristic data, an imaging operation performed by the imagining element of the biological sample at a position where the focus adjustment has already been executed.

14. The signal acquisition apparatus according to claim 1, wherein
the detector includes an imaging element,
the circuitry is configured to acquire signals from the imagining element from the light from the biological sample at a plurality of positions in an optical axis direction, and
the circuitry is further configured to acquire from a set of the signals acquired at the plurality of positions, signal correlation information or focus state information.

15. The signal acquisition apparatus according to claim 14, wherein
the focus state information includes a focus detection value.

16. The signal acquisition apparatus according to claim 14, wherein
the circuitry is configured to generate an output image based on a plurality of pieces of the focus state information and control the imaging element to output the output image.

17. The signal acquisition apparatus according to claim 16, wherein
the output image includes an image generated from a signal acquired at a certain Z position in the set of signals.

18. The signal acquisition apparatus according to claim 15, wherein
an output image from the imaging element includes an image generated from a most focused signal in the set of signals.

19. The signal acquisition apparatus according to claim 14, wherein
an output image from the imaging element includes an image generated from signals acquired at a plurality of Z positions in the set of signals.

20. The signal acquisition apparatus according to claim 14, wherein the circuitry is also configured to apply the learned model to image data from the imaging element to generate an output image of the biological sample.

21. The signal acquisition apparatus according to claim 14, wherein
the circuitry is configured to
divide respective images based on the set of signals acquired at the plurality of positions into a plurality of regions,
acquire focus state information regarding each of the plurality of regions, and
connect images of regions in focus to generate an output image.

22. The signal acquisition apparatus according to claim 1, wherein
the circuitry is configured to acquire spectrum effective region information based on previously obtained output from the detector.

23. The signal acquisition apparatus according to claim 22, wherein
the circuitry is configured to acquire the spectrum effective region information by using the learned model.

24. The signal acquisition apparatus according to claim 22, wherein
the circuitry is configured to control a readout region of the detector based on the spectrum effective region information.

25. The signal acquisition apparatus according to claim 1, wherein
the circuitry is configured to acquire the output from the detector from the light from the biological sample through an objective lens.

26. The signal acquisition apparatus according to claim 1, wherein
the biological sample includes a bio-derived tissue sample.

27. A sensor comprising:
a detector configured to detect light from a biological sample in a plurality of conditions and generate output data based on the detected light, and
circuitry configured to apply a learned model to the output data provided by the detector to determine characteristic data about the biological sample according to a condition, the condition being at least one of the plurality of conditions, the condition comprising detection of the light from the biological sample at a plurality of different light wavelengths.

28. A signal acquisition system comprising:
a signal acquisition apparatus including
a light source configured to irradiate a biological sample with light, and
a single semiconductor chip that includes
a detector configured to produce a signal from light returned from the biological sample irradiated with the light by the light source in a plurality of conditions, and
circuitry configured to
apply a learned model to the signal provided by the detector to determine characteristic data about the biological sample according to a condition under which the detector produced the signal, the condition being at least one of the plurality of conditions, the condition comprising detection of the light from the biological sample at a plurality of different light wavelengths; and
analysis circuitry configured to analyze the characteristic data output from the signal acquisition apparatus.

29. The signal acquisition system according to claim 28, wherein the signal acquisition system includes a medical image acquisition system.

30. The signal acquisition system according to claim 28, wherein
the signal acquisition system includes an endoscope system or a microscope system.

31. A signal acquisition method comprising:
irradiating a biological sample with light from a light source;
detecting, with a detector, light from the biological sample in a plurality of conditions; and
applying, with circuitry, a learned model to an output provided by the detector and determining characteristic data about the biological sample according to a condition, the condition being at least one of the plurality of conditions, the condition comprising detection of the light from the biological sample at a plurality of different light wavelengths wherein
the detector and the circuitry being contained within a single semiconductor chip.

* * * * *